US012372195B2

(12) United States Patent
Massey et al.

(10) Patent No.: US 12,372,195 B2
(45) Date of Patent: Jul. 29, 2025

(54) DISPLAY MOUNT ASSEMBLY

(71) Applicant: Manehu Product Alliance, LLC, Carlsbad, CA (US)

(72) Inventors: Kurt William Massey, Mooresville, NC (US); Brian Newville, San Diego, CA (US)

(73) Assignee: MANEHU PRODUCT ALLIANCE, LLC, Carlsbad, CA (US)

( * ) Notice: Subject to any disclaimer, the term of this patent is extended or adjusted under 35 U.S.C. 154(b) by 0 days.

(21) Appl. No.: 18/232,346

(22) Filed: Aug. 9, 2023

(65) Prior Publication Data

US 2024/0110663 A1 Apr. 4, 2024

Related U.S. Application Data

(63) Continuation of application No. 17/733,787, filed on Apr. 29, 2022, now Pat. No. 11,774,033, which is a
(Continued)

(51) Int. Cl.
*F16M 11/18* (2006.01)
*F16M 11/04* (2006.01)
(Continued)

(52) U.S. Cl.
CPC .......... *F16M 11/18* (2013.01); *F16M 11/046* (2013.01); *F16M 11/048* (2013.01);
(Continued)

(58) Field of Classification Search
CPC .... F16M 11/18; F16M 11/046; F16M 11/048; F16M 11/08; F16M 13/02; F16M 2200/063
(Continued)

(56) References Cited

U.S. PATENT DOCUMENTS 2,090,439 A 8/1937 George
2,630,854 A 3/1953 Paul
(Continued)

FOREIGN PATENT DOCUMENTS

CA 3073367 A1 3/2019
CN 104424849 A 3/2015
(Continued)

OTHER PUBLICATIONS

ISA, International Search Report and Written Opinion for International Application No. PCT/IB2018/57591. Mail Date: Jan. 29, 2019.
(Continued)

*Primary Examiner* — Anita M King
(74) *Attorney, Agent, or Firm* — Perkins Coie LLP

(57) ABSTRACT

A device for wall mounting a display including a mount assembly and a swivel mechanism assembly. The mount assembly includes a television mounting portion and an extending/contracting portion and the swivel mechanism assembly moveable between a first and a second configuration and including a biasing component. The extending/contracting portion includes a lower arm, an upper arm, a front bracket, a wall mounting bracket, one or more gas springs, and a linear actuator. The one or more gas springs and the linear actuator may lower and raise the television mounting portion. The biasing component is configured to bias the television mounting portion to swivel in a first or a second direction when the swivel mechanism assembly is in the first configuration when the display mounting portion is lowered. The mount assembly may include a set screw to set a swivel stop for the first and the second swivel directions.

14 Claims, 16 Drawing Sheets

Related U.S. Application Data continuation-in-part of application No. 17/090,701, filed on Nov. 5, 2020, now Pat. No. 11,346,496, which is a continuation of application No. 16/375,835, filed on Apr. 4, 2019, now Pat. No. 10,859,201.

(60) Provisional application No. 63/304,296, filed on Jan. 28, 2022, provisional application No. 62/655,805, filed on Apr. 10, 2018.

(51) Int. Cl.
*F16M 11/08* (2006.01)
*F16M 13/02* (2006.01)

(52) U.S. Cl.
CPC ............ *F16M 11/08* (2013.01); *F16M 13/02* (2013.01); *F16M 2200/063* (2013.01)

(58) Field of Classification Search
USPC .................................................. 248/231.91
See application file for complete search history.

(56) References Cited

U.S. PATENT DOCUMENTS

| | | |
|---|---|---|
| 4,076,351 A | 2/1978 | Wyant |
| 4,082,244 A | 4/1978 | Groff |
| 4,561,674 A | 12/1985 | Alessio |
| 4,691,886 A | 9/1987 | Wendling et al. |
| 5,037,054 A | 8/1991 | McConnell |
| 5,108,063 A | 4/1992 | Koerber et al. |
| 5,135,191 A | 8/1992 | Schmuhl |
| 5,224,677 A | 7/1993 | Close |
| 5,299,993 A | 4/1994 | Habing |
| 5,499,956 A | 3/1996 | Habing et al. |
| 5,560,501 A | 10/1996 | Rupert |
| 5,738,316 A | 4/1998 | Sweere et al. |
| 5,743,503 A | 4/1998 | Voeller et al. |
| 5,826,846 A | 10/1998 | Buccieri et al. |
| 5,842,672 A | 12/1998 | Sweere et al. |
| 5,857,756 A | 1/1999 | Fehre |
| 5,876,008 A | 3/1999 | Sweere et al. |
| 6,065,725 A | 5/2000 | Mason |
| 6,065,909 A | 5/2000 | Cook |
| 6,105,909 A | 8/2000 | Wirth et al. |
| 6,419,196 B1 | 7/2002 | Sweere et al. |
| 6,523,796 B2 | 2/2003 | Abramowsky et al. |
| 6,592,090 B1 | 7/2003 | Li |
| 6,695,274 B1 | 2/2004 | Chiu |
| 6,889,404 B2 | 5/2005 | Lu et al. |
| 6,905,101 B1 | 6/2005 | Dittmer |
| 6,983,917 B2 | 1/2006 | Oddsen |
| 7,014,157 B2 | 3/2006 | Oddsen |
| 7,061,753 B2 | 6/2006 | Michoux et al. |
| 7,252,277 B2 | 8/2007 | Sweere et al. |
| 7,290,744 B2 | 11/2007 | Baldasari |
| 7,300,029 B2 | 11/2007 | Petrick et al. |
| 7,314,200 B2 | 1/2008 | Bally et al. |
| 7,395,996 B2 | 7/2008 | Dittmer |
| 7,398,950 B2 | 7/2008 | Hung |
| 7,448,584 B2 | 11/2008 | Chen et al. |
| 7,546,745 B2 | 6/2009 | Lee et al. |
| 7,546,994 B2 | 6/2009 | Altonji et al. |
| 7,663,868 B1 | 2/2010 | Lam |
| 7,854,415 B2 | 12/2010 | Holbrook et al. |
| 7,866,622 B2 | 1/2011 | Dittmer |
| 7,950,613 B2 | 5/2011 | Anderson et al. |
| 8,006,440 B2 | 8/2011 | Thomas et al. |
| 8,074,950 B2 | 12/2011 | Clary |
| 8,094,438 B2 | 1/2012 | Dittmer et al. |
| 8,333,355 B2 | 12/2012 | Stifal et al. |
| 8,382,052 B1 | 2/2013 | Mathieson et al. |
| 8,724,037 B1 | 5/2014 | Massey |
| 8,740,164 B2 | 6/2014 | Tachibana |
| 8,746,635 B2 | 6/2014 | Kim et al. |
| 8,864,092 B2 | 10/2014 | Newville |
| 8,960,632 B2 | 2/2015 | Fallows |
| 9,004,430 B2 | 4/2015 | Conner |
| 9,016,648 B2 | 4/2015 | Smeenk |
| 9,121,543 B2 | 9/2015 | Dittmer et al. |
| 9,265,346 B1 | 2/2016 | Forney |
| 9,433,293 B2 | 9/2016 | Gross et al. |
| 9,625,091 B1 | 4/2017 | Massey |
| 9,876,984 B2 | 1/2018 | Massey |
| 9,999,557 B2 | 6/2018 | Diaz-Flores et al. |
| 10,139,045 B1 | 11/2018 | Keuter |
| 10,257,460 B2 | 4/2019 | Massey |
| 10,277,860 B2 | 4/2019 | Massey |
| 10,281,080 B1 | 5/2019 | Massey |
| 10,659,279 B2 | 5/2020 | Chiu et al. |
| 10,738,941 B2 | 8/2020 | Newville et al. |
| 10,830,580 B2 | 11/2020 | Hodowany |
| 10,859,201 B2 | 12/2020 | Newville |
| 10,935,180 B1 | 3/2021 | Massey |
| 11,033,107 B2 | 6/2021 | Warren |
| 11,077,547 B2 | 8/2021 | Gosselin |
| 11,178,354 B2 | 11/2021 | Massey |
| 11,287,080 B2 | 3/2022 | Newville et al. |
| 11,346,493 B2 | 5/2022 | Massey |
| 11,346,496 B2 | 5/2022 | Newville |
| 11,460,145 B2 | 10/2022 | Massey |
| 11,647,838 B2 | 5/2023 | Warren |
| 11,668,434 B2 | 6/2023 | Newville et al. |
| 11,774,033 B2 | 10/2023 | Massey et al. |
| 11,802,653 B2 | 10/2023 | Massey et al. |
| 2002/0033436 A1 | 3/2002 | Peng et al. |
| 2002/0043978 A1 | 4/2002 | McDonald |
| 2002/0100851 A1 | 8/2002 | Abramowsky et al. |
| 2002/0179791 A1 | 12/2002 | Kwon |
| 2004/0084587 A1 | 5/2004 | Oddsen |
| 2005/0010911 A1 | 1/2005 | Kim et al. |
| 2005/0110911 A1 | 5/2005 | Childrey et al. |
| 2005/0152102 A1 | 7/2005 | Shin |
| 2005/0204645 A1 | 9/2005 | Bachinski et al. |
| 2005/0236543 A1 | 10/2005 | Oneil |
| 2006/0070210 A1 | 4/2006 | Amdahl et al. |
| 2006/0077622 A1 | 4/2006 | Keely et al. |
| 2006/0102819 A1 | 5/2006 | Li |
| 2007/0007412 A1 | 1/2007 | Wang |
| 2007/0023599 A1 | 2/2007 | Fedewa |
| 2007/0030405 A1 | 2/2007 | Childrey et al. |
| 2007/0040084 A1 | 2/2007 | Sturman et al. |
| 2007/0205340 A1 | 9/2007 | Jung |
| 2007/0221807 A1 | 9/2007 | Park |
| 2007/0252056 A1 | 11/2007 | Novin |
| 2008/0078906 A1 | 4/2008 | Hung |
| 2008/0237424 A1 | 10/2008 | Clary |
| 2009/0034178 A1 | 2/2009 | Le |
| 2009/0050757 A1 | 2/2009 | Oh et al. |
| 2009/0050763 A1 | 2/2009 | Dittmer |
| 2009/0108158 A1 | 4/2009 | Kim et al. |
| 2009/0179133 A1 | 7/2009 | Gan et al. |
| 2009/0206221 A1 | 8/2009 | Timm et al. |
| 2009/0212669 A1 | 8/2009 | Robert-Reitman et al. |
| 2010/0006725 A1 | 1/2010 | Kim et al. |
| 2010/0091438 A1 | 4/2010 | Dittmer |
| 2010/0149736 A1 | 6/2010 | Dittmer et al. |
| 2010/0155558 A1 | 6/2010 | Zhang et al. |
| 2010/0171013 A1 | 7/2010 | Anderson et al. |
| 2011/0043978 A1 | 2/2011 | Bremmon et al. |
| 2011/0234926 A1 | 9/2011 | Smith |
| 2012/0032062 A1* | 2/2012 | Newville ............... F16M 13/02 248/575 |
| 2012/0033371 A1 | 2/2012 | Pankros et al. |
| 2012/0061543 A1 | 3/2012 | Juan |
| 2012/0167486 A1 | 7/2012 | Lee |
| 2013/0176667 A1 | 7/2013 | Kulkarni et al. |
| 2013/0187019 A1 | 7/2013 | Dittmer et al. |
| 2013/0320163 A1 | 12/2013 | Wong |
| 2014/0211100 A1 | 7/2014 | Massey |
| 2015/0277214 A1 | 10/2015 | Schuh |
| 2017/0105529 A1 | 4/2017 | Kozlowski et al. |
| 2018/0054156 A1 | 2/2018 | Lokey |
| 2018/0131895 A1 | 5/2018 | Massey |
| 2018/0310459 A1 | 11/2018 | Blunier |

(56) References Cited

U.S. PATENT DOCUMENTS

| | | |
|---|---|---|
| 2018/0352189 A1 | 12/2018 | Massey |
| 2019/0072231 A1 | 3/2019 | Newville et al. |
| 2019/0309895 A1 | 10/2019 | Newville |
| 2019/0335135 A1 | 10/2019 | Massey |
| 2020/0049304 A1 | 2/2020 | Hung |
| 2020/0355319 A1 | 11/2020 | Newville et al. |
| 2020/0390009 A1 | 12/2020 | Whitehead et al. |
| 2020/0408353 A1 | 12/2020 | Massey |
| 2021/0190259 A1 | 6/2021 | Newville |
| 2022/0150441 A1 | 5/2022 | Massey |
| 2022/0252209 A1 | 8/2022 | Newville |
| 2023/0016050 A1* | 1/2023 | Newville ............. F16M 11/046 |
| 2024/0027020 A1 | 1/2024 | Newville et al. |

FOREIGN PATENT DOCUMENTS

| | | |
|---|---|---|
| CN | 109605346 A | 4/2019 |
| CN | 111031859 A | 4/2020 |
| GB | 2222939 A | 3/1990 |
| GB | 2579974 A | 7/2020 |
| KR | 100705069 B1 | 4/2007 |
| KR | 20070081731 A | 8/2007 |
| WO | 2019043670 A1 | 3/2019 |
| WO | 2019183822 A1 | 10/2019 |
| WO | 2021127552 A1 | 6/2021 |

OTHER PUBLICATIONS

ISA, International Search Report and Written Opinion, PCT Patent Application PCT/US2020/066196, mailed Apr. 9, 2021, 13 pages.
ISA, International Search Report and Written Opinion, PCT Patent Application PCT/US2021/017141, mailed Jun. 1, 2021, 11 pages.
ISA, International Search Report and Written Opinion, PCT Patent Application PCT/US2021/017492, mailed Jun. 3, 2021, 17 pages.
MantelMount MM750 Pro Above Fireplace Pull Down TV Mount, accessed Dec. 3, 2020 from https://www.mantelmount.com/products/mm750-pro-pull-down-tv-mount, 6 pages.
MentelMount RB100 Recess Box—MantelMount Pull Down TV Mount Accessory, accessed Dec. 3, 2020 from https://www.mantelmount.com/products/mantelmount-rb100-recess-box, 6 pages.

* cited by examiner

DISPLAY MOUNT ASSEMBLY

CROSS-REFERENCE TO RELATED APPLICATIONS

This application is a continuation of U.S. application Ser. No. 17/733,787, filed on Apr. 29, 2022, which is a continuation-in-part of U.S. patent application Ser. No. 17/090,701, filed on Nov. 5, 2020, entitled DISPLAY MOUNT ASSEMBLY (now U.S. Pat. No. 11,346,496), which is a continuation of U.S. patent application Ser. No. 16/375,835 (now U.S. Pat. No. 10,859,201) entitled DISPLAY MOUNT ASSEMBLY, filed on Apr. 4, 2019, which claims the benefit of U.S. Provisional Application No. 62/655,805, entitled DISPLAY MOUNT ASSEMBLY, filed on Apr. 10, 2018, and U.S. application Ser. No. 17/733,787 also claims the benefit of U.S. Provisional Application No. 63/304,296, entitled DISPLAY MOUNT ASSEMBLY, filed on Jan. 28, 2022, all of which are hereby incorporated by reference in their entireties as if fully set forth herein, including the Specifications, Figures, Claims, and all other matter.

TECHNICAL FIELD

This present disclosure generally relates to the field of retractable/extendable mounts for appliances. More particularly, the present disclosure relates to retractable wall mounts for displays such as television sets (TVs) with television swivel mechanisms.

BACKGROUND

A good mounting place for a large flat screen display (such as a TV) is often high on a wall, for example, above a fireplace. Such mounting location may make it necessary or desirable to lower the display for watching from a convenient location in a room. In the course of lowering the TV, it may need to clear an obstacle, for example, a fireplace mantel below the mounting location. The force for lowering and raising the TV may be provided, for example, manually, by gas springs, and/or by linear actuators.

Typically, when the TV is raised, it should be flat or substantially flat against the wall, so that it will not protrude and become an obstacle and so that one of its sides will not crash into the wall and cause damage to the appliance itself and/or the wall. At the same time, it is desirable to allow convenient watching of the TV from some angle, that is, for watching positions that are not necessarily right in front of the wall mount. Towards this end, a swiveling mechanism may be included to provide for right-left swiveling with respect to the TV's vertical axis. Borrowing from aeronautics (Tait-Bryan angles) and analogizing the TV to an aircraft with its nose pointing in the direction normal to the screen and pointing in the viewer's direction, the swiveling would provide yaw or heading adjustment; we can alternatively call one of the angles that the axis normal to the screen would form with an axis normal to the wall (and at the same vertical level as the axis normal to the screen) an "azimuth," "azimuth angle," "swivel position," or "swivel angle."

As has already been mentioned, the TV may be flat or substantially flat (not noticeably different from flat) against the wall in the retracted position, and possibly at some azimuth angle when extended for viewing. But for better viewing from the retracted position, the TV may be angled slightly forward. It is generally preferable, however, for the TV to be retracted so that the azimuth is close to zero, thereby preventing one side (left or right) from crashing into the wall on which the TV mounting assembly is mounted.

U.S. Pat. No. 8,864,092 ("the '092 patent"), Brian Newville inventor, is incorporated by reference herein in its entirety, including claims and all other matter. The '092 patent describes an "auto-straightening" mechanism with lower arm perpendicular protrusions that automatically straighten a TV as the wall mount retracts the TV towards the mounting wall. When a user manually pulls the TV on the mount with the auto-straightening mechanism, the user can manually adjust the swivel for the desired azimuth, for convenient viewing angle. This is inconvenient. If the retraction/extension function of the wall mount is automated (power-assisted) and remote-controlled, the user may still need to adjust the swivel after the wall mount extends the display or TV from the wall into the viewing position. This is also inconvenient.

SUMMARY

A need in the art exists for new and better techniques for mounting various devices, including displays and TVs. A need in the art exists for more convenient manual and power-assisted wall mounts for displays and TVs. A need in the art exists for manual and power-assisted wall mounts that do not require the user to adjust the azimuth from the straightforward or random direction, after each extension.

Embodiments, variants, and examples described in this present disclosure are directed to apparatus and methods that may satisfy one or more of the above-described needs and/or other needs.

In an embodiment, a mounting device includes a wall mounting portion, a display mounting portion, and an extending/contracting portion. The extending/contracting portion includes a lower arm, an upper arm, a wall mounting bracket, a front bracket opposite the wall mounting bracket, one or more gas springs, and a linear actuator. The one or more gas springs and the linear actuator are arranged selectively to retract and extend the display mounting portion. The lower arm includes protrusions for automatically straightening a display attached to the display mounting portion. The display mounting portion and the extending/contracting portion together include a mechanism for automatically adjusting azimuth (e.g., swivel) of the display mounting portion to a pre-set position when the display mounting portion is lowered into a viewing position. The mechanism for automatically adjusting azimuth may include a set screw and a biasing spring.

In an embodiment, a mounting device includes a wall mounting portion configured to be attached to a wall; a display mounting portion; and an extending/contracting portion between the wall mounting portion and the display mounting portion. The display mounting portion is configured to receive and support a display so that the display faces away from the wall. The extending/contracting portion is configured to allow the display mounting portion to move up and towards the wall, and down and away from the wall. The display mounting portion is attached to the extending/contracting portion so that the display mounting portion can swivel horizontally. The extending/contracting portion includes an adjustably-extending component setting a predetermined azimuth of the display mounting portion and a biasing component configured to bias the display mounting portion against the adjustably-extending component at the predetermined azimuth. The adjustably-extending component and the biasing component automatically set the display mounting portion to a predetermined azimuth in response to the display mounting portion being lowered and moved away from the wall, and allow the display mounting portion to move towards a position parallel to the wall when the display mounting portion is raised and moved towards the wall.

In certain aspects, the extending/contracting portion includes a front mounting bracket that does not swivel with the display mounting portion; the front mounting bracket includes a first surface having portions defining a first hole on a first side off center of the first surface; the mounting device further includes a vertical center rod that attaches the display mounting portion to the front mounting bracket so that the display mounting portion can swivel horizontally; and the adjustably-extending component extends through the first hole so that the adjustably-extending component can be adjusted to protrude through the first hole away from the wall at a variable length that sets the predetermined azimuth.

In certain aspects, the adjustably-extending component is a set screw and one or more nuts. The variable length of the adjustably-extending component protruding through the first hole can be adjusted by turning the set screw and the one or more nuts relative to each other, thereby adjusting the predetermined azimuth.

In certain aspects, the mounting device also includes a plurality of pegs with different lengths. Each of the pegs of the plurality of pegs is insertable into and fixable in the first hole, wherein the adjustably-extending component comprises a selected peg of the plurality of pegs inserted into the first hole and fixed into the first hole. In this way, the variable length of the adjustably-extending component protruding through the first hole can be adjusted by the user/installer selecting the selected peg, thereby adjusting the predetermined azimuth.

In certain aspects, the portions defining the first hole have a female thread, and the adjustably-extending component includes a set screw with a male thread matching the female thread of the first hole, so that the variable length of the adjustably-extending component protruding through the first hole can be adjusted by turning the set screw, thereby adjusting the predetermined azimuth.

In certain aspects, the biasing component is an elastic band having a first end attached to the front mounting bracket on the first side and a second end attached to the display mounting portion on the first side, the elastic band being in extended state to bias the display mounting portion to swivel to the first side.

In certain aspects, the biasing component includes a spring having a first end attached to the front mounting bracket on the first side and a second end attached to the display mounting portion on the first side, the spring being in extended state to bias the display mounting portion to swivel to the first side.

In certain aspects, the spring is a coil spring operating in tension mode.

In certain aspects, the spring is a leaf spring.
In certain aspects, the spring is a volute spring.
In certain aspects, the spring is a V-spring.
In certain aspects, the spring is a torsion spring.
In certain aspects, the spring is a gas spring.

In certain aspects, the first surface also has a female-threaded hole off center on a second side of the first surface, the second side being horizontally opposite to the first side.

In certain aspects, the extending/contracting portion also includes: a lower arm with a first lower arm end and a second lower arm end; an upper arm with a first upper arm end and a second upper arm end; a wall mounting bracket rigidly attached to the wall mounting portion; a gas spring to support the display mounting portion, the gas spring having a first gas spring end and a second gas spring end; and a linear actuator with a first actuator end and a second actuator end. The gas spring and the linear actuator are arranged to retract and extend the display mounting portion selectively. The lower arm has protrusions to automatically straighten the display mounting portion when the extending/contracting portion contracts to lower the display mounting portion.

In certain aspects, the extending/contracting portion also includes a plurality of attachment axles. The upper arm is attached to the wall mounting portion at the first upper arm end with at least a first attachment axle of the plurality of attachment axles to allow the upper arm to rotate around the first attachment axle when the display mounting portion is raised and lowered. The lower arm is attached to the wall mounting portion at the first lower arm end with at least a second attachment axle of the plurality of attachment axles to allow the lower arm to rotate around the first attachment axle when the display mounting portion is raised and lowered. The upper arm is attached at the second upper arm end to the front mounting bracket with at least a third attachment axle of the plurality of attachment axles to allow the upper arm to rotate around the third attachment axle when the display mounting portion is raised and lowered. And the lower arm is attached at the second lower arm end to the front mounting bracket with at least a fourth attachment axle of the plurality of attachment axles to allow the lower arm to rotate around the fourth attachment axle when the display mounting portion is raised and lowered.

In certain aspects, the first actuator end is attached to the wall mounting portion at a first attachment point, and to the display mounting portion at a second attachment point; the linear actuator can rotate around the first attachment point and rotate around the second attachment point when the display mounting portion is raised and lowered; the first gas spring end is attached to the wall mounting portion at a third attachment point, and to the display mounting portion at a fourth attachment point; and the gas spring can rotate around the third attachment point and rotate around the fourth attachment point when the display mounting portion is raised and lowered.

In certain aspects, the embodiment also includes a remote control receiver configured to receive signals from a remote control unit and operate the linear actuator in response to the signals.

In certain aspects, the embodiment also includes the remote control unit, and the remote control receiver and the remote control unit operate using signals selected from the group consisting of radio frequency signals, infrared signals, and ultrasound signals.

In certain aspects, a television mount is configured to swivel a television in response to vertical movement. In motorized embodiments, an actuator can raise or lower the television. The vertical movement of the television can simultaneously cause mechanical movement (e.g., tilting, swiveling, etc.) of the television. For example, a movable component (e.g., a lifting arm, swivel assembly, etc.) can mechanically position (e.g., vertical/horizontal position) a television mounting television bracket via a unidirectional connection or a multidirectional connection (e.g., bi-direction connection) using a pushing force, pulling force, movement, torque, etc. A multidirectional connection can include one or more linkages. Television mounts configured for single direction contact can include one or more linear springs, torsion springs, pushing rams, pulling hooks, etc. In some embodiments, the components of the television mount can be mechanically connected such that selected components contact one another to position the television in response to the television is moving toward or into specific position(s) or configuration(s). For example, horizontal movement (e.g., swivel rotation, horizontal translation, etc.) of the television can be related to the vertical movement (e.g., rotation, translation, etc.). In some embodiments, television swiveling (e.g., swivel angle, rotational speed, angular position, etc.) can be proportional to vertical movement of the television. A user can select one or more swivel settings such that a television mounting portion begins to swivel when moved to a first vertical position and reaches a user-set swivelled/rotated position when the television mounting portion reaches a second vertical position. The user can set the first and second vertical positions. The television mount can include an extending/contracting portion configured to allow the television mounting portion to move up and toward the wall to a raised position and to move down and away from the wall to a lowered position. mount assembly can further include swivel mechanism assembly coupled to the mount assembly.

In some embodiments, a mounting device comprises a wall mounting portion configured to couple to a wall, a display mounting portion configured to carry a display, an actuator, and an extending/contracting portion between the wall mounting portion and the display mounting portion. The actuator can be operable to raise and lower the display. The extending/contracting portion is configured to allow the display mounting portion to move up and toward the wall and to move down and away from the wall. The extending/contracting portion can be configured to contact components of the mounting device to move the display to preset positions based on the vertical position of the display. The actuator can be a motorized actuator that raises and lowers the display.

The extending/contracting portion can include one or more adjustably-extending components configured to set a predetermined azimuth position of the display mounting portion and a biasing component configured to cause the display mounting portion to rotate to the predetermined azimuth position when the display mounting portion is moved away from the wall. The biasing component can allow the adjustably-extending component to cause the display mounting portion to move from the predetermined azimuth position toward a stowed position (e.g., a position parallel to the wall) when the display mounting portion is moved toward the wall. The extending/contracting portion can include one or more cams, linear springs, torsion springs, pushing rams, pulling hooks, or the like. The mount assembly can further include swivel mechanism assembly coupled to the mount assembly. The mounting device can include a controller that communicates with a control device. The control device can include a receiver that is communicatively coupled (e.g., wirelessly coupled, capacitively coupled, inductively coupled, or the like) to a transmitter of the controller. The control device can store information in memory and can include one or more computing devices or processors.

These and other features and aspects of selected embodiments, variants, and examples consistent with the present disclosure will be better understood with reference to the following description, drawings, and appended claims.

DETAILED DESCRIPTION

Figure 1:
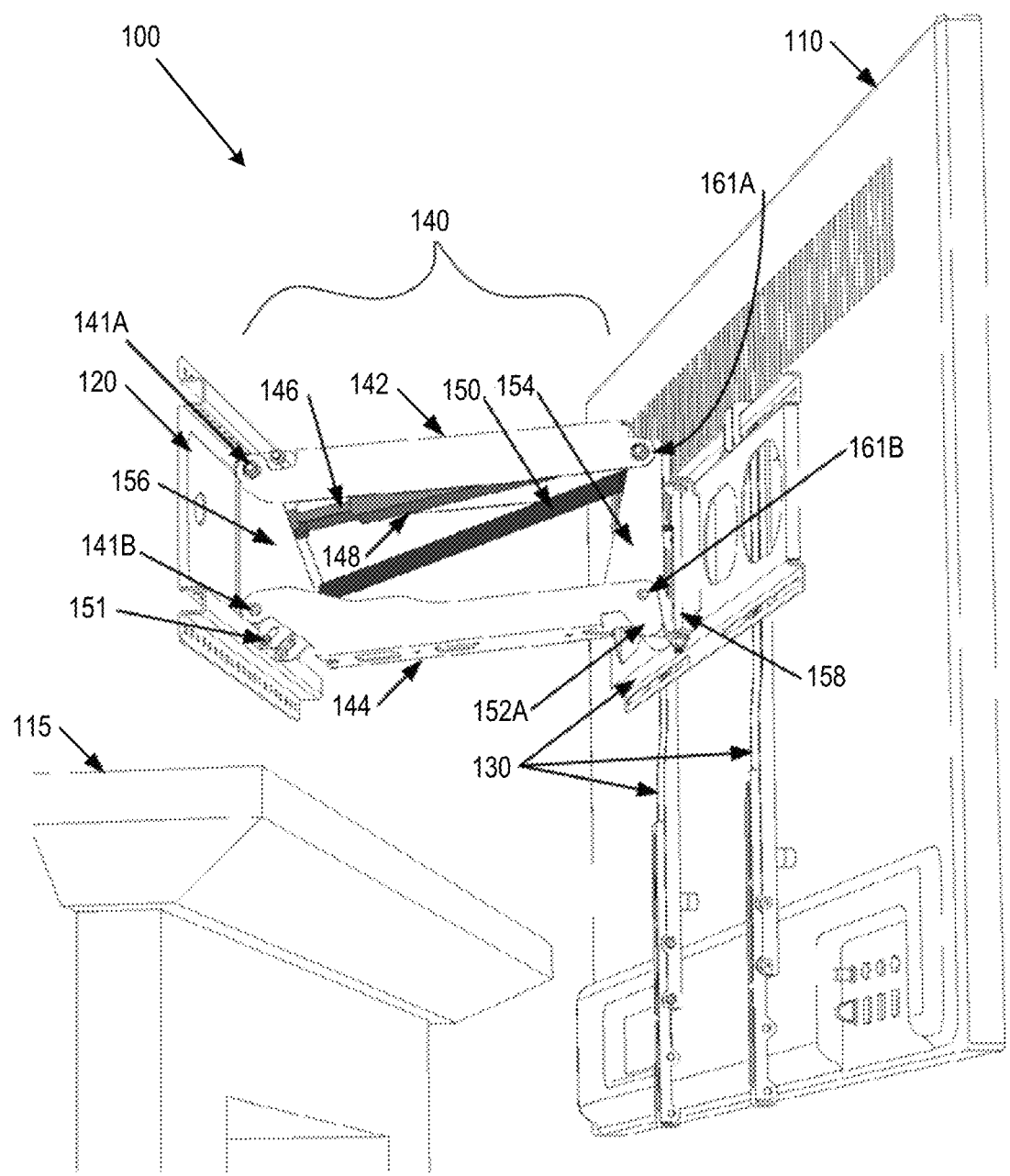
FIG. 1 is a left-side perspective view illustrating selected components of a wall mount assembly for displays.

Reference will be made in detail to one or more embodiments that are illustrated in the accompanying drawings, their features, and alternative embodiments. The same reference numerals are used in the drawings and the description to refer to the same apparatus elements and method steps (if applicable). The drawings are in simplified form, not necessarily to scale, and omit apparatus and articles of manufacture elements and method steps that can be added to the described apparatuses, articles of manufacture, and methods, while including certain optional elements and steps. For purposes of convenience and clarity, directional terms, such as top, bottom, left, right, up, down, over, above, below, beneath, rear, and front, may be used with respect to the accompanying drawings. These and similar directional terms should not be construed to limit the scope of the invention in any manner. The reference to "right" and "left" in describing the drawings are generally intended to refer to, respectively, the right side and left side of a user standing in front of the TV and facing the TV, in a viewing position. The description of each Figure should be interpreted in conjunction with the Figure itself and with the other related Figures.

The words such as "connect," "couple," "attach," and similar terms with their inflections do not necessarily denote direct and immediate connections/attachments; they include within their meaning direct/immediate connections, couplings, and attachments; and also connections, couplings, and attachments using intermediate elements or devices. This applies to electrical/electronic and mechanical items.

The words "embodiment," "variant," "example," and similar words and expressions as used herein refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may, but need not be, a currently preferred embodiment, variant, or example. All embodiments, variants, and examples are described for illustration purposes and do not necessarily strictly limit the invention(s) disclosed.

Some definitions have been explicitly provided above. Other and further explicit and implicit definitions and clarifications of definitions may be found throughout this present disclosure.

FIG. 1 is a left-side perspective view illustrating selected components of a wall mount assembly 100. The wall mount assembly 100 includes three major sets of components: a wall mounting portion 120, which may be attached to a wall above a fireplace 115; a display mounting portion 130 which may have a TV 110 mounted on its front; and an extending/contracting portion 140 between the wall mounting portion 120 and the display mounting portion 130. The extending/contracting portion 140 is shown in the extended configuration, with the TV 110 away from the wall. The extending/contracting portion 140 may lower the TV 110 further, and raise it above the fireplace, to be close to the wall (flat or substantially flat with the wall, possibly slightly angling forward). As shown in FIG. 1, the TV 110 is swiveled somewhat to the right.

The extending/contracting portion 140 includes an upper arm 142, a lower arm 144, a wall mounting bracket 156, a front bracket 154, gas (pneumatic) springs 146 on the left and 148 on the right, and a linear actuator 150. Note that the lower arm 144 includes a protrusion 152A on the right; a similar protrusion 152B exists on the opposite side of the lower arm 144, as will be shown in other Figure(s) described below.

The upper arm 142 and the lower arm 144 are attached to the wall mounting bracket 156 with rear axles 141A and 141B, respectively, and can rotate relative to the wall mounting bracket 156 about their respective axles, within limited ranges. The rotation ranges are sufficient to lower the TV 110 into various positions and raise the TV 110 to the wall, above the wall mounting portion 120. The lower end of the ranges may be adjustable, for example, by moving the bolt/nut combinations 151 in the slots on each side of the wall mounting bracket 156. The rear axles 141A/141B may be, for example, rods or bolts capped with nuts on their ends. There may be one such axle of attachment per one of the arms 141 or 142, meaning that the axle goes through its respective arm from one side to the other and provides support/attachment on both sides (right and left) of the respective arm; there may also be two such rear axles per one of the respective arms 141 or 142, meaning that the rear axle goes through only one side of its respective arm 141 or 142 and provides support only on one side (left or right). In certain embodiments, one of the arms 141/142 is attached to the wall mounting bracket 156 with a single rear axle, while the other arm 142/141 is attached to the wall mounting bracket 156 with two shorter rear axles, one per side. The wall mounting bracket 156 may be attached to the wall mounting portion 120 with various means, for example, screws, nuts, or welds.

The upper arm 142 and the lower arm 144 are also attached to the front bracket 154 with axles 161A and 161B, respectively, and can rotate relative to the front bracket 154 about their respective axles. This arrangement and its variants may be analogous to the attachment of the arms 141, 142 to the wall mounting bracket 156.

The gas springs 146, 148 and the linear actuator 150 are attached to the wall mounting bracket 156 on one end. For example, the gas springs 146, 148 may be attached to the wall mounting bracket 156 directly or with a spring block, which may be adjustable in the vertical dimension (with a calibration screw, for example) for varying the force provided by the gas springs 146, 148 and accommodating displays of varying weight. The linear actuator 150 may be attached to the wall mounting bracket 156 directly or with an actuator block that allows some adjustment. On the other end, proximate the front bracket 154, the gas springs 146, 148 and the linear actuator 150 are attached to the upper arm 142.

Figure 2:
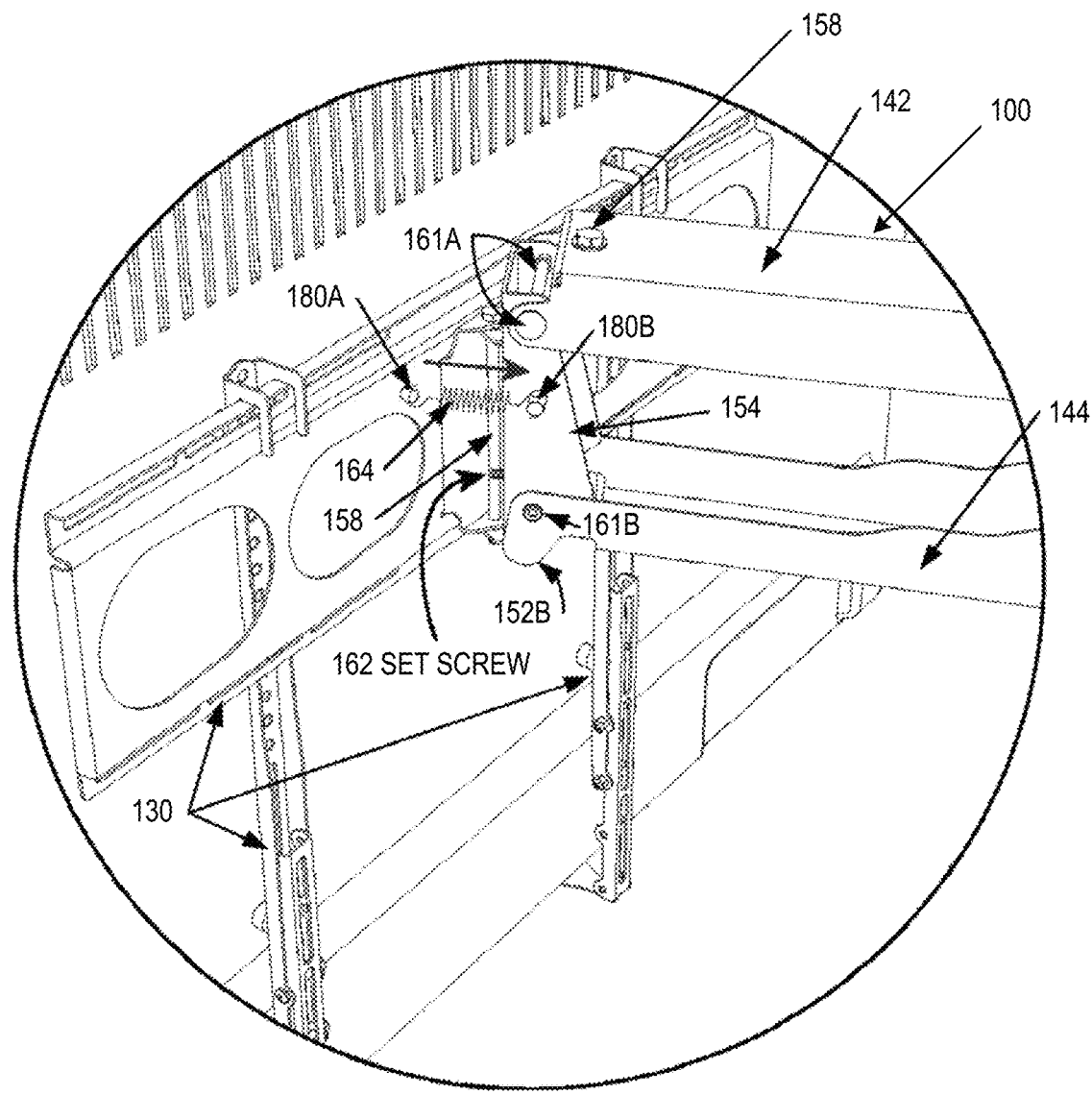
FIG. 2 is a partial right-side perspective view illustrating selected components of the wall mount assembly of FIG. 1.
Figure 3:
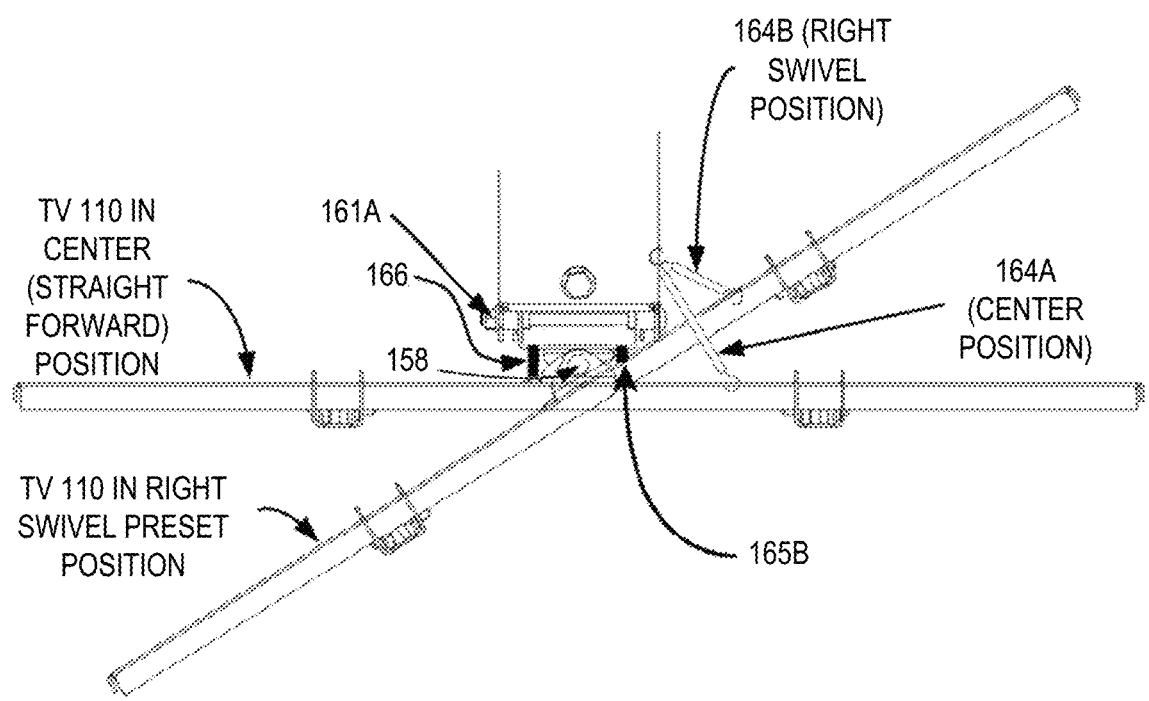
FIG. 3 is a top view of the wall mount assembly of FIGS. 1 and 2 with the display in a center position and in a right swivel position.

A rod 158 capped on the upper and lower ends attaches the display mounting portion 130 to the front bracket 154, allowing the display mounting portion 130 and the TV 110 attached to it to swivel right-left. The FIGS. 1-3 show a single vertical rod 158. Two or more concentric vertical rods can be used in its place; for example, the display mounting portion 130 may be attached to the front bracket 154 with two shorter vertical concentric rods with a vertical space in-between them, to allow the display mounting portion 130 to swivel right-left. One of the two shorter vertical concentric rods may be towards the bottom of the display mounting portion 130, the other towards the top. There may be more than two such vertical concentric rods, for example, three, four, or even more. Note also that the rod (or rods, as the case may be) is/are vertical when the display mounting portion 130 and the TV 110 point horizontally and are not angled/tilted low or high. (In the present context, the display mounting portion 130 and the TV 110 "point" in the direction normal to the screen of the TV 110, away from the wall.) Thus, the rod(s) may not be exactly vertical at all times, though it/they may be vertical or substantially vertical when the display mounting portion 130 and the TV 110 are retracted and pulled flat against the wall.

In the fully-raised position, the weight of the TV 110 (or another display in its place) is supported entirely or partially by the gas springs 146/148, and the wall mount assembly 100 may thus remain in this position without application of additional forces. To extend (e.g., lower) the TV 110, the linear actuator 150 is activated to cause it to shorten and thereby pull the TV 110 down and away from the wall, as the upper arm 142 and the lower arm 144 rotate about their respective axles 141A and 141B; from the extended position, lengthening of the actuator 150 pushes the TV 110 up and nearer the wall. Note that the linear actuator 150 is mounted on the wall mounting bracket 156 lower than the gas springs 146/148. The geometry of the wall mount assembly 100 is, therefore, such that the shortening of the linear actuator 150 causes the TV 110 to extend from the wall and be lowered; and vice versa, the lengthening of the linear actuator 150 raises the TV 110 and moves it closer to the wall.

FIG. 2 is a partial right-side perspective view illustrating selected components of the wall mount assembly 100. The protrusion 152B on this side of the lower arm 144 (mentioned earlier) is visible in the Figure.

Note the set screw 162 that protrudes forward (away from the wall, toward the user/viewer) from the front bracket 154. The set screw 162 is user- and/or installer-adjustable, allowing for varying the length it protrudes forward from the front bracket 154. It is located off the (vertical) centerline of the front bracket 154, to the right side, so that it prevents the TV from swiveling to the right beyond the point where the protruding end (463, FIG. 6B) of the set screw 162 makes contact with the swiveling display mounting portion 130, thus limiting the swiveling angle of the TV to the right. As the name implies, the set screw 162 may have a thread, and the hole in the front bracket through which the set screw 162 protrudes may have a matching thread. In embodiments, the hole diameter may be about the same as or somewhat larger than the diameter of the shaft of the set screw, and a nut with a matching thread or a similar device may be attached to one side of the front bracket concentric with the hole, to allow the set screw to protrude through the nut and the hole, and to allow the protruding portion of the set screw to be adjusted by rotating the set screw in the hole/nut; in such embodiments, the nut may be considered to be part of the front bracket. Such arrangement can be seen in FIG. 3, described below.

Other techniques of adjusting the length of the protruding portion may be used as well. In some embodiments, the wall mount assembly 100 may come with multiple pegs of various lengths; the pegs are insertable into the hole in the front bracket 154 and fixed therein, by the user and/or installer, thereby selecting the length of the protruding portion and determining the azimuth of the display mounting portion 130 and the TV 110 when the extending/contracting portion 140 is extended to lower the wall mount assembly 100. In some embodiments, nuts on the opposite end of a set screw or a threaded rod (similar to a screw but possibly without a screw cap) may be used by the user/installer to select the length of the protruding portion and thereby determine the azimuth of the display mounting portion 130 and the TV 110 when the extending/contracting portion 140 is extended to lower the wall mount assembly 100.

Note also a biasing spring 164 that is attached to the swiveling display mounting portion 130 on its right side and to the non-swiveling front bracket 154. The attachment means shown in the Figure are small posts 180A and 180B protruding, respectively, from the display mounting portion 130 and the front bracket 154, each of the posts having a small hole; other attachment means are contemplated, such as holes made directly in the display mounting portion 130 and the front bracket 154, hooks or screws on the 130/154, welding points, and others.

The arrow above the spring 164 indicates that the spring 164 is extended, pulling the right side of the display mounting portion 130 and biasing it to swivel to the right until it contacts and is stopped by the set screw 162. In operation, once the display mounting portion 130 is extended/lowered into the viewing position, it will swivel under the action of the spring 164 until it is stopped by the protruding set screw 162. Recall that the set screw 162 is adjustable, so that the viewing azimuth can be set to the user's preference as part of the installation or later. In embodiments, the set screw 162 may be quite long and extended so that the selected viewing position is towards the left side, despite the spring 164 and the set screw 162 being located on the right side. When the wall mount assembly 100 is retracted/raised, the auto-straightening mechanism (the protrusions 152A and 152B, possibly including small wheels, as is described in the '092 patent) overcomes the force of the spring 164 and straightens the TV 110 so that it can be held evenly against the wall (flat or with a small angle to the front).

In the illustrated embodiment of FIG. 1 and FIG. 2, the mechanism for automatically adjusting the swivel position (azimuth) to the pre-set position (including the set screw 162, the biasing spring 164, and the posts 180A, 180B) is shown on the right side. As a person of average skill in the art would understand after careful perusal of this present disclosure and the Figures, an analogous mechanism for automatically adjusting the swivel position may be located on the left side, with changes necessitated by the left-side location. Thus, the small posts 180A, 180B for attaching the biasing spring (or other means for biasing spring attachment) may be located on the left side of the display mounting portion 130 and on the left side of the front bracket 154; and a set screw may protrude forward from the front of the front surface bracket 154 through a hole that is also on the left side of the front surface of the front bracket 154.

In certain embodiments, there are holes on both sides of the front surface of the front bracket 154, and the small posts or other means for selectively attaching the biasing spring are also provided on both sides. The placement of two set screws is illustrated in FIG. 3, which is a top view of the wall mount assembly 100 with the TV 110 in two positions: (1) a straightforward position (as would be the case if the preselected viewing azimuth is center, with no swivel to either side, or when retracted flat against the wall); and (2) the right swivel position. Note a second set screw 166 on the left. It is not used here for setting the preferred swivel angle for watching the TV 110, but may be used to limit the swivel to the left, for example, to avoid striking the TV 110 against the wall or another obstacle. The installer or the user may attach the biasing spring on the preferred side, and adjust the set screw on the same or opposite side for the desired swivel position. (Recall that with sufficient length of the operative set screw, the set screw and the biasing spring may be used, in some embodiments, for either side viewing, as has been described above.) Note also nuts 163A and 163B, attached on the inner side of the front surface of front bracket 154; these nuts are threaded and may be considered as the parts of the threaded portions of the front bracket 154, as has already been mentioned above. Again, other techniques of adjusting the length of the protruding portion of the set screw may be used as well, on either or both sides.

The mechanism for automatically adjusting the swivel position described so far employs a coil spring operating in a tension mode. In certain embodiments, however, the biasing spring may operate in a compression mode. For example and referencing FIG. 2, a compression mode spring may be located on the left side, instead of the illustrated tension mode biasing spring 164 shown on the right side. Moreover, the biasing spring need not be a coil spring; it may be a leaf spring, a V-spring, a torsion spring, a volute spring, a gas spring, or another type of spring. In fact, a rubber band may be used, for example, substituted for the tension biasing spring 164. Other devices that apply force (e.g., pulling, pushing) may also be used.

In certain embodiments, the wall mount assembly 100 may include a remote control unit and a receiver of the remote control unit connected to the linear actuator 150, to allow the user remotely to extend/lower the display (e.g., the TV 110) to the viewing position and/or retract/raise the display to the storage position near the wall above the fireplace. The remote control unit may communicate with the receiver using, for example, radio frequency (RF) signals, infrared (IR) signals, and ultrasound signals. Through the remote control unit, the user can selectively power the linear actuator 150 to cause it to extend, extending and lowering the wall mount assembly 100 and display into the viewing position; and to retract, retracting and raising the wall mount assembly 100 and display into the storage position near the wall. Note that the auto-straightening mechanism will automatically position the display evenly against the wall when the display is retracted/raised; and the mechanism for automatically adjusting the swivel position will automatically set the display in the preset swivel angle (preset with the set screw 162) when the display is extended/lowered. Thus, the user may not need to get up to adjust the swivel position after the display is lowered.

For the convenience of viewing, the wall mount assembly 100 may be configured so that in the fully extended configuration, the TV 110 is angled forward (top of the TV 110 is further away from the wall), for example, between 8 and 18 degrees; and in the fully retracted configuration, the TV 110 is angled slightly forward, for example, between 0 and 5 degrees.

Some wall mount assemblies 100 may also include a swivel mechanism assembly that swivels the display mounting portion 130 and, if attached, the TV 110, to a predetermined swivel position, either to the left or to the right, when the wall mount assembly 100 is fully lowered. Example motorized mount assemblies 100 and adjustable swivel mechanism assemblies are discussed regarding FIGS. 4-14.

Figure 4:
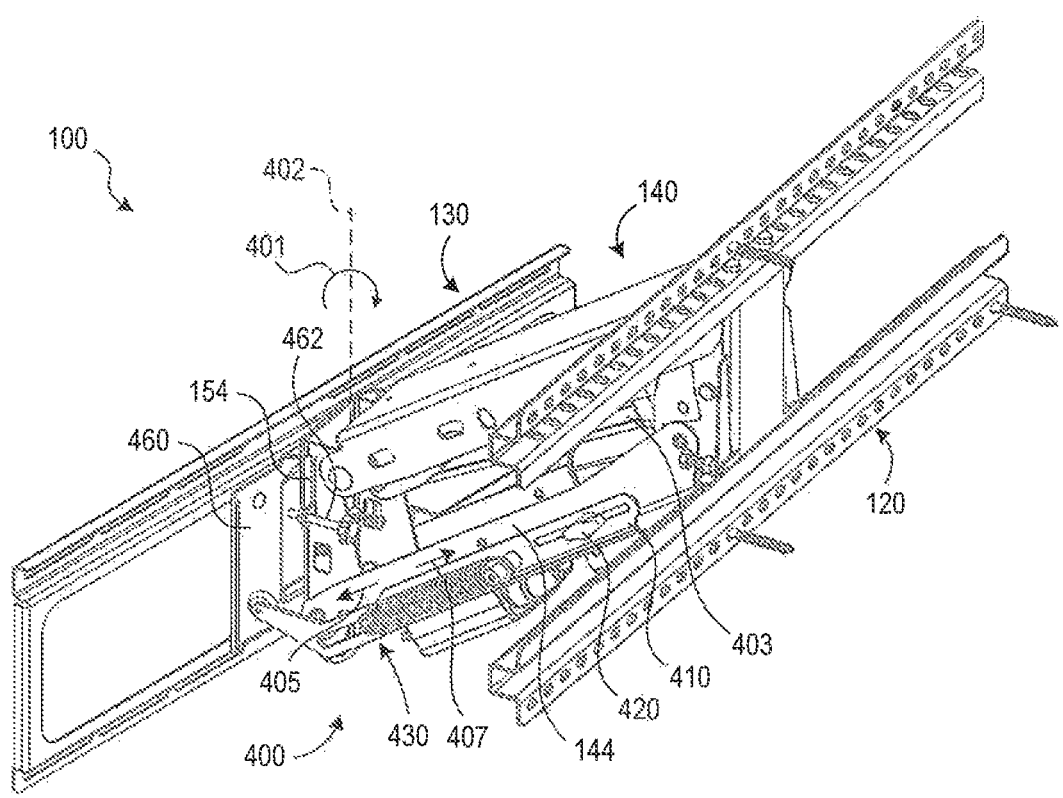
FIG. 4 is an isometric view of a lowered wall mount assembly with a television mounting portion positioned at a left-swiveled position by a right-side swivel mechanism assembly in accordance with at least some embodiments.
Figure 5:
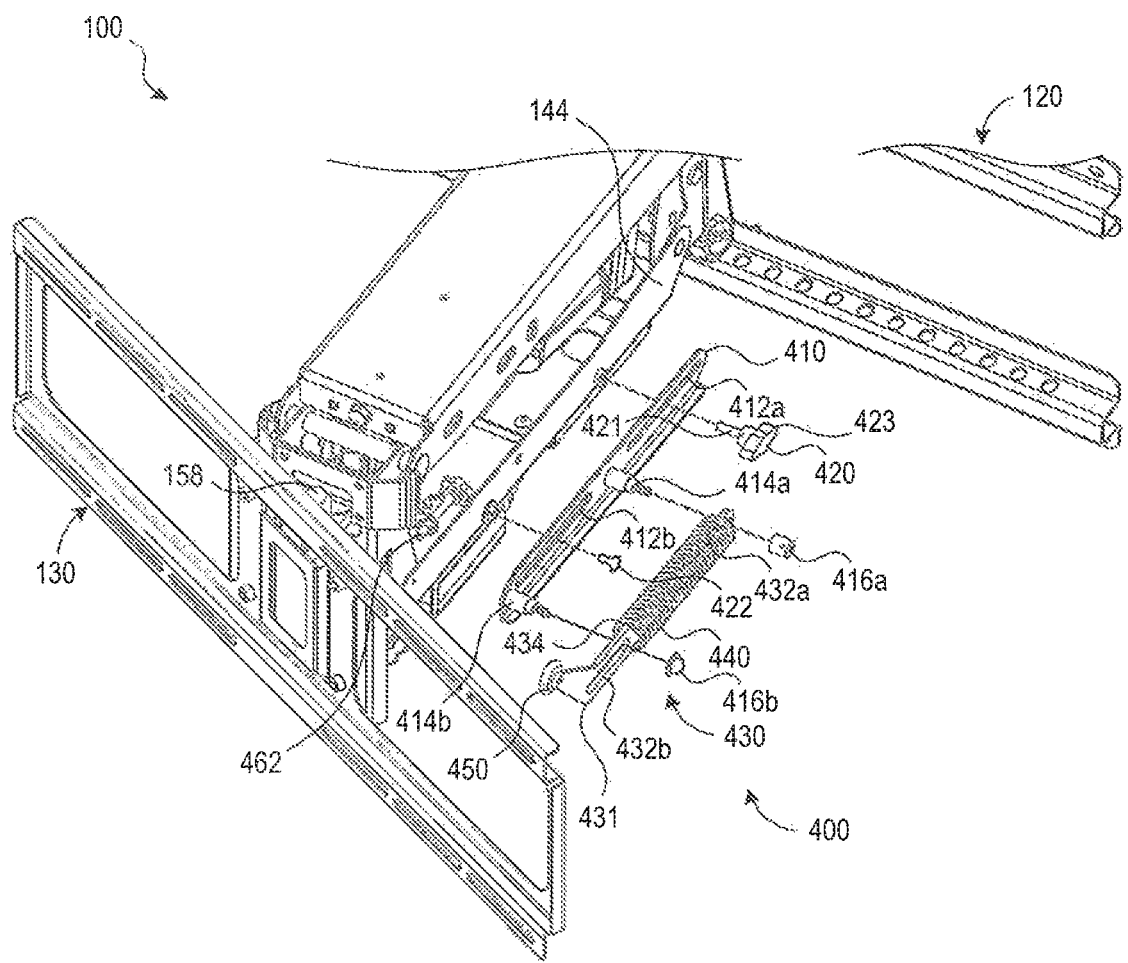
FIG. 5 is a partial exploded front isometric view of the lowered wall mount assembly of FIG. 4.

FIG. 4 is an isometric view of a lowered wall mount assembly 100 with a swivel mechanism assembly 400 in a partially forward configuration. When the wall mount assembly 100 is moved toward the illustrated lowered position via an actuator 403, the swivel mechanism assembly 400 pushes against the television mounting portion 130 to swivel (arrow 401) the television mounting portion 130 about an axis of rotation 402 aligned with the rod 158 (FIG. 5). In some embodiments, the television mounting portion 130 can be swiveled until the television mounting portion 130 contacts a left-side set screw (right-side set screw 462 is visible in FIG. 4) on the left side of the extending/contracting portion 140. The swivel mechanism assembly 400 can be spring-biased to, for example, provide cushioning upon initial contact with the television mounting portion 130, hold the television mounting portion 130 against the set screw, or provide similar functions for smooth operation of the swivel mechanism assembly 400. The user can manually move the swivel mechanism assembly 400 forward or rearward (indicated by arrows 405 and 407) to increase or decrease, respectively, the swivel angle of the television mounting portion 130. For example, the swivel mechanism assembly 400 can be moved anywhere between a forward and a rearward configuration. The forward configuration and partially forward configurations are discussed in connection with FIGS. 6A-6B, 7A-7B, and 9A-9C for setting a maximum swivel angle or maximum force the swivel mechanism assembly 400 exerts against the television mounting portion 130. The rearward configuration is discussed in connection with FIG. 8 for storing the swivel mechanism assembly 400 or otherwise preventing the swivel mechanism assembly 400 from contacting the television mounting portion 130.

As previously discussed, the wall mount assembly 100 may include the wall mounting portion 120, the display mounting portion 130, and the extending/contracting portion 140. The wall mounting portion 120 may include mounting rails (as illustrated in FIGS. 4, 5, 7A-7B, 11, and 12B-14) or the wall mounting portion 120 may include a mounting bracket (as illustrated in FIGS. 6A, 8, and 9A-9C). The back side of the display mounting portion 130 may include a camming surface 460. The extending/contracting portion 140 may include the front bracket 154, the lower arm 144, a set screw or screws 462 on the right or left side of the lower arm 144, and the rod 158 (FIG. 5). The rod 158 attaches the display mounting portion 130 to the front bracket 154 and allows the display mounting portion 130 to swivel to the right or left about the axis of rotation 402. The wall mount assembly 100 may further include swivel mechanism assemblies 400 on the right side, left side, or both, of the wall mount assembly 100 and attached to the lower arm 144. The swivel mechanism assemblies 400 may include an adjustment arm 410, an adjustment knob assembly 420, and a cam assembly 430, and may be placed in the forward or the partially forward configuration to swivel the display mounting portion 130 to a predetermined swivel position, as determined by the swivel mechanism assembly 400 and the set screw 462, when the wall mount assembly 100 moves from the raised position to the lowered position. The swivel mechanism assembly 400 may also be placed in the rearward configuration to store or prevent the swivel mechanism assembly 400 from contacting the display mounting portion 130.

FIG. 5 is a partially exploded partial front isometric view of the lowered wall mount assembly of FIG. 4 with the right-side swivel mechanism assembly 400 attached to the right side of the wall mount assembly 100 and in a partially forward configuration. The adjustment arm 410 may be an elongated member with a first adjustment arm slot 412a and a second adjustment arm slot 412b (collectively, the "adjustment arm slots 412a—b"), and a first alignment post 414a and a second alignment post 414b (collectively, the "alignment posts 414a—b"). The adjustment arm slots 412a—b can be straight elongated slots generally aligned along the centerline of the adjustment arm 410. The adjustment arm 410 may be coupled to the lower arm 144 by the adjustment knob assembly 420 and a retention bolt or element 422. The adjustment knob assembly 420 can include a threaded shaft 421 and a knob 423. The threaded shaft 421 can extend through the first adjustment arm slot 412a. The retention element 422 can extend through the second adjustment arm slot 412b. The threaded shaft 421 can be configured to engage a threaded hole in the lower arm 144 for securing the adjustment arm 410 to the lower arm 144. The retention element 422 may also have a threaded shaft that corresponds with a threaded hole in the lower arm 144 for securing the adjustment arm 410 to the lower arm 144. The retention element 422 may alternatively be welded, riveted, or otherwise fixedly coupled to the lower arm 144. The alignment posts 414a—b can extend from the adjustment arm 410 opposite the lower arm 144 and interface with the cam assembly 430.

The adjustment arm 410 may be prevented from sliding relatively to the lower arm by tightening the adjustment knob assembly 420 to press the adjustment arm 410 against the lower arm 144. For example, when the adjustment knob assembly 420 is tightened, the knob 423 can compress the adjustment arm 410 against the lower arm 144. Then, when the adjustment knob assembly 420 is loosened, the adjustment arm 410 can slide along the retention element 422 and the threaded shaft 421. In this configuration, the adjustment arm 410 may slide along the lengths of the adjustment arm slots 412a—b, limited by the interface between the adjustment knob assembly 420 and the retention element 422 with the adjustment arm slots 412a—b, respectively. The position of the swivel mechanism assembly 400 along the lower arm 144 can be selected based on desired locking capabilities and may include, for example, locking pins, position indicia (e.g., markings indicating TV swivel angles), or the like.

The cam assembly 430 can include an elongated cam arm 431 with a first cam assembly slot 432a and a second cam assembly slot 432b (collectively, the "cam assembly slots 432a—b"), a cam arm shoulder 434, a biasing component 440, and a cam 450. The cam assembly slots 432a—b can be straight elongated slots along the length of the cam arm 431. The cam assembly 430 may be attached to the adjustment arm 410 by the first alignment post 414a extending through the first cam assembly slot 432a with a first alignment bolt 416a fastened to the first alignment post 414a, and the second alignment post 414b extending through the second cam assembly slot 432b with a second alignment bolt 416b fastened to the second alignment post 414b. The cam arm shoulder 434 may be between the cam assembly slots 432a—b, adjacent to the second cam assembly slot 432B. The biasing component 440 may be disposed around the cam arm 431 and in contact with the cam arm shoulder 434 at a first end and in contact with the first alignment post 414a at a second end.

In this configuration, the cam arm 431 may slide along the lengths of the cam assembly slots 432a—b, limited by the interface between the alignment posts 414a-b and the cam assembly slots 432a—b, respectively. When the cam arm 431 is moved toward the wall mounting portion 120, the biasing component 440 exerts a biasing force against the cam arm shoulder 434 and the first alignment post 414a to bias the cam arm 431 away from the wall mounting portion 120. When the wall mount assembly 100 lowers, this operation of the biasing component 440 may provide cushioning upon initial contact with the television mounting portion 130, hold the television mounting portion 130 against the set screw, or provide similar functions for smooth operation of the swivel mechanism assembly 400. As illustrated, the biasing component 440 is a coil spring. However, the biasing component 440 may be any structure that, when compressed, biases the cam arm 431 away from the wall mounting portion 120.

The cam 450 may be a portion of the cam arm 431 at an end of the cam arm 431 closest to the display mounting portion 130 configured to interface with the camming surface 460 of the display mounting portion 130. As illustrated, the cam 450 is a wheel rotatably coupled to the cam arm 431. The cam 450 alternatively may be any structure that can repeatably rub against the camming surface 460 without sticking or experiencing excessive wear at high wall mount assembly 100 operating cycle counts.

Figure 6A:
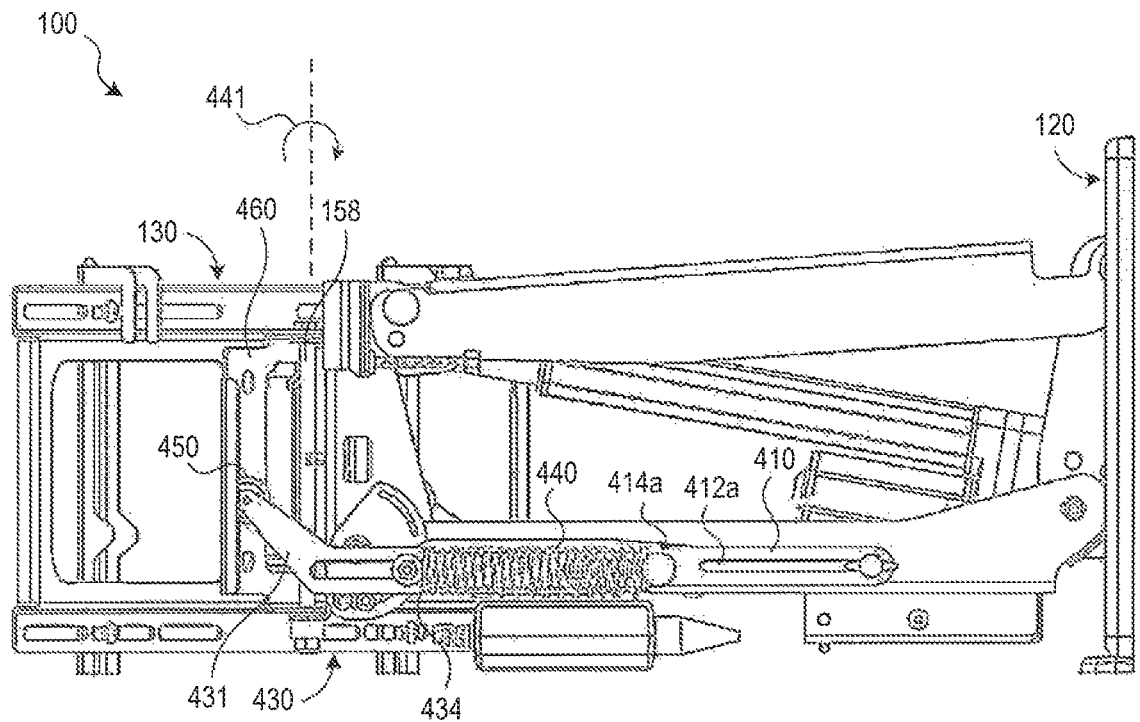
FIG. 6A is a partial right-side view of the lowered wall mount assembly of FIG. 4 with a right-side swivel mechanism assembly in a forward configuration.
Figure 6B:
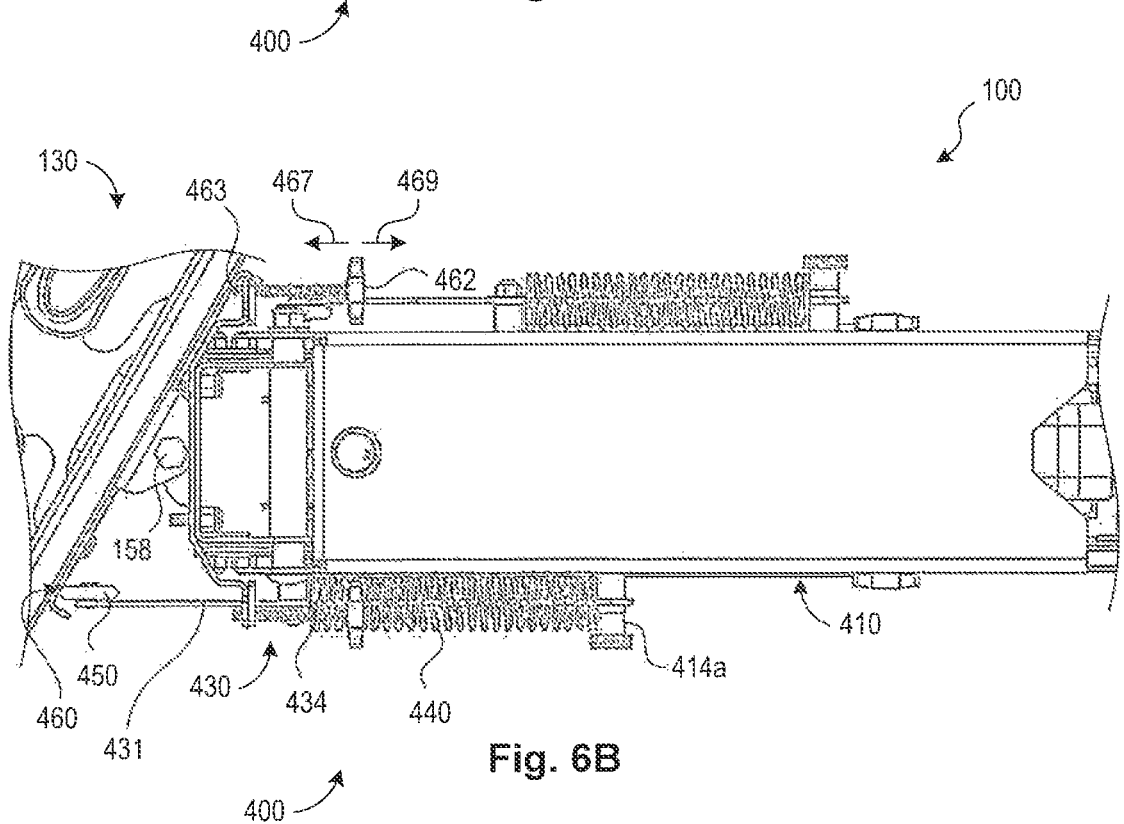
FIG. 6B is a partial top view of the lowered wall mount assembly of FIG. 6A with the left-side and right-side swivel mechanism assemblies in a rearward configuration and the forward configuration, respectively.

FIGS. 6A and 6B show the lowered wall mount assembly 100 of FIG. 4 with the right-side swivel mechanism assembly 400 in the forward configuration swiveling the display mounting portion 130 to the furthest possible left swivel position. Here, when the swivel mechanism assembly 400 is in the forward configuration, the adjustment arm 410 is furthest from the wall mounting portion 120 with the adjustment knob assembly 420 and the retention element 422 at the furthest right end of the adjustment arm slots 412a—b, respectively. In this position, when the wall mount assembly 100 is lowered, the biasing component 440 exerts a force against the first alignment post 414a and the cam arm shoulder 434 to bias the cam arm 431 and cam 450 away from the wall mounting portion 120 and into the camming surface 460. When the cam 450 presses against the camming surface 460, the display mounting portion 130 is swiveled about the rod 158 to the left (as indicated by arrow 441). The display mounting portion 130 can continue to swivel until the display mounting portion 130 contacts an end 463 of the left set screw 462 (FIG. 6B) on the left side of the wall mount assembly 100. The user can adjust the left set screw 462 (e.g., indicated by arrows 467, 469) to set the maximum swivel angle. Accordingly, the swivel mechanism assembly 400 can swivel the television mount portion 140 until the television mount portion 140 contacts the set screw 462 on the opposite side of the wall mount assembly 100. As illustrated, the left-side swivel mechanism assembly 400 is the rearward configuration, stored and not contacting the display mounting portion 130.

Figure 7A:
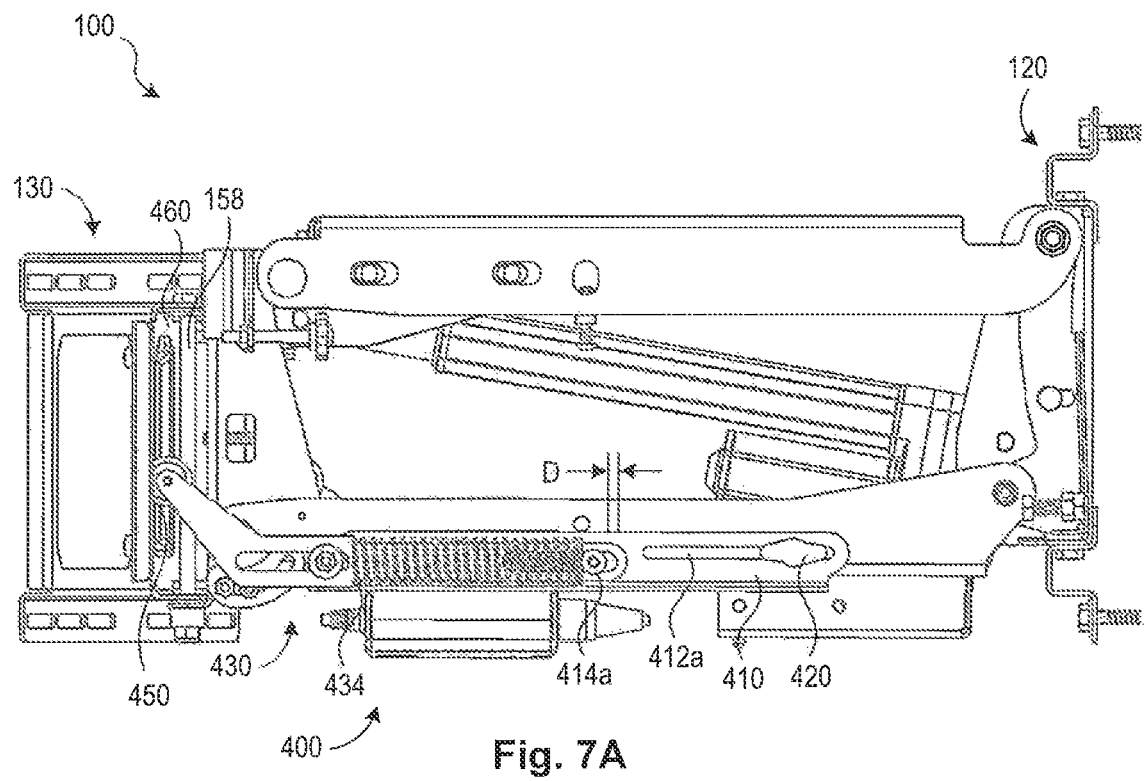
FIG. 7A is a right-side view of the lowered wall mount assembly of FIG. 4 with the right-side swivel mechanism assembly partially compressed and in a partially forward configuration.
Figure 7B:
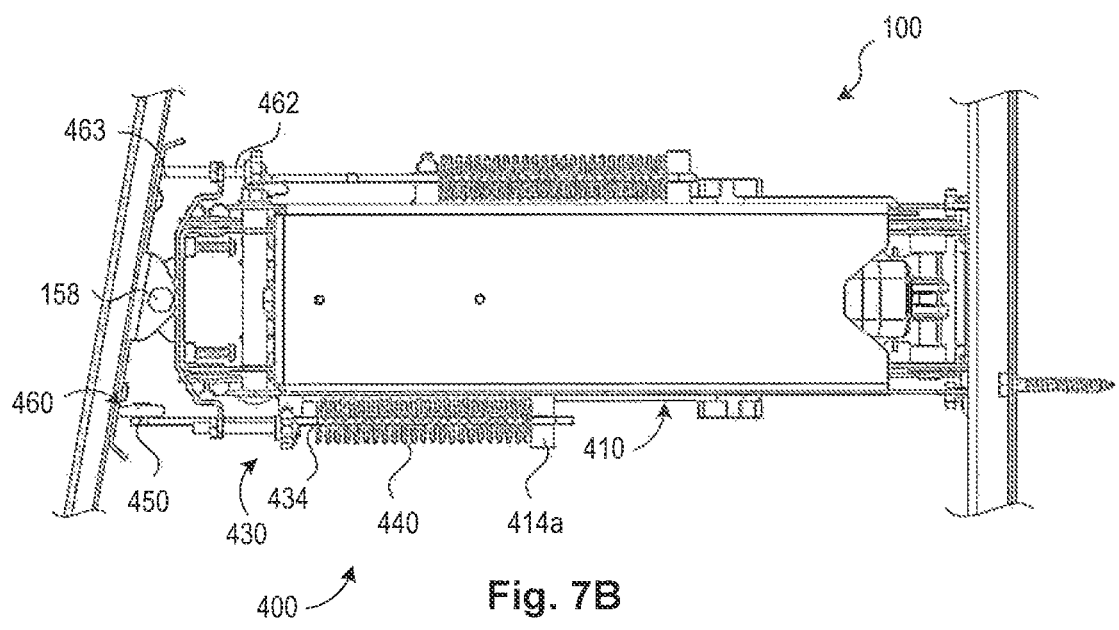
FIG. 7B is a partial top view of the lowered wall mount assembly of FIG. 7A with the right-side swivel mechanisms in a partially forward configuration and the left-side swivel mechanism assembly in a rearward configuration.

FIGS. 7A and 7B show the lowered wall mount assembly 100 of FIG. 4 with the right-side swivel mechanism assembly 400 in the partially forward configuration swiveling the display mounting portion 130 to the left. Here, with the swivel mechanism assembly 400 is in the partially forward configuration, the adjustment knob assembly 420 and the retention element 422 are spaced apart from ends of the adjustment arm slots 412a—b, respectively. In this position, when the wall mount assembly 100 is lowered, the biasing component 440 exerts a force against the first alignment post 414a and the cam arm shoulder 434 to bias the cam arm 431 and cam 450 away from the wall mounting portion 120 and into the camming surface 460. When the cam arm 431 and cam 450 press against the camming surface 460, the display mounting portion 130 may be swiveled about the rod 158 to the left. The display mounting portion 130 continues to swivel until the display mounting portion 130 contacts the end 463 of the left set screw 462 (FIG. 7B) on the left side of the wall mount assembly 100. As discussed in connection with FIGS. 6A and 6B, the user can adjust the left set screw 462 to set the maximum swivel angle. As shown here, the set screw 462 sets a maximum swivel angle for the display mounting portion 130 less than the furthest possible left swivel position of the wall mount assembly 100. As illustrated, the left-side swivel mechanism assembly 400 is the rearward configuration, stored and not contacting the display mounting portion 130.

The swivel mechanism assembly 400 on the left side of the wall mount assembly 100 of FIGS. 6A-7B may similarly function as the illustrated right-side swivel mechanism assembly 400 to swivel the display mounting portion 130. For example, when the left-side swivel mechanism assembly 400 is in the forward or the partially forward configuration and the wall mount assembly 100 is lowered, the left-side swivel mechanism assembly 400 exerts a force against the camming surface 460 to swivel the display mounting portion 130 to the right until the display mounting portion 130 contacts the end of the right set screw (FIGS. 6B, 7B).

Figure 8:
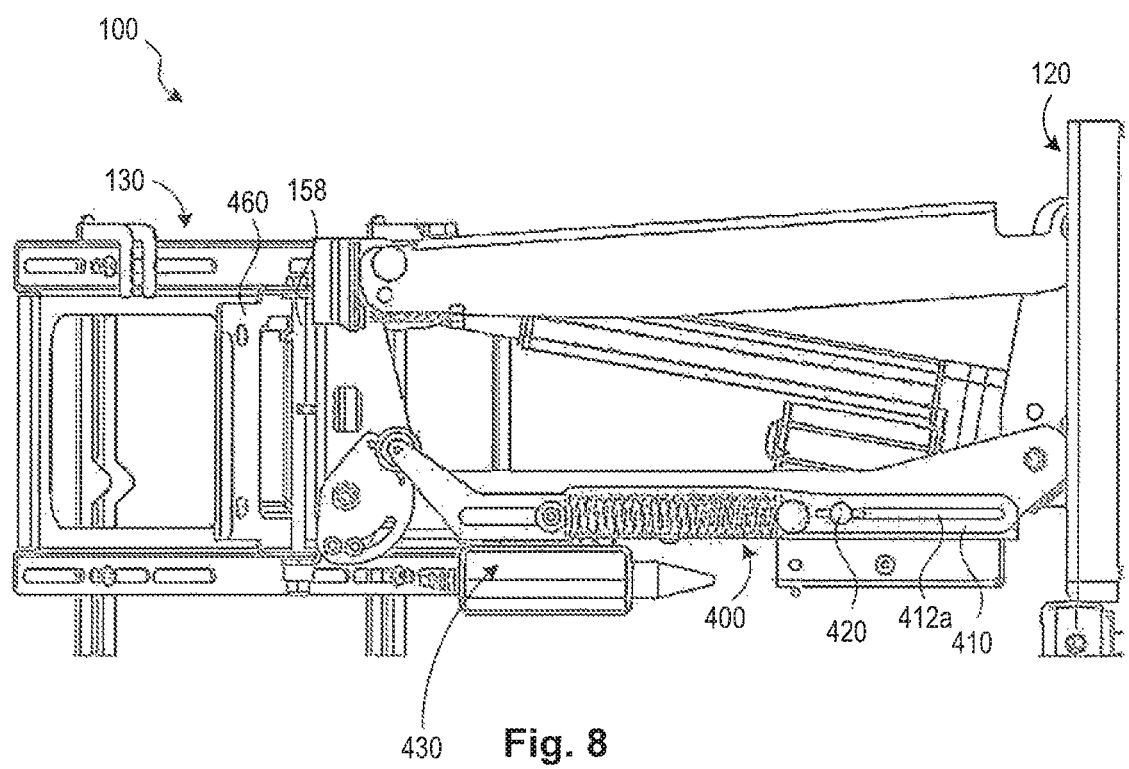
FIG. 8 is a right-side view of the lowered wall mount assembly of FIG. 4 with the right-side swivel mechanism assembly in a rearward configuration.

FIG. 8 is a side view of the lowered wall mount assembly of FIG. 4 with the swivel mechanism assembly 400 in the rearward configuration. In the rearward configuration, the adjustment arm 410 is furthest from the display mounting portion 130 with the adjustment knob assembly 420 and the retention element 422 at the furthest left end of the adjustment arm slots 412a—b, respectively. Here, the swivel mechanism assembly 400 does not engaged with the camming surface 460 when the wall mount assembly 100 is lowered. The display mounting portion 130 of FIG. 8 is swiveled to the left for illustrative purposes to expose the retracted swivel mechanism assembly 400.

Figure 9A:
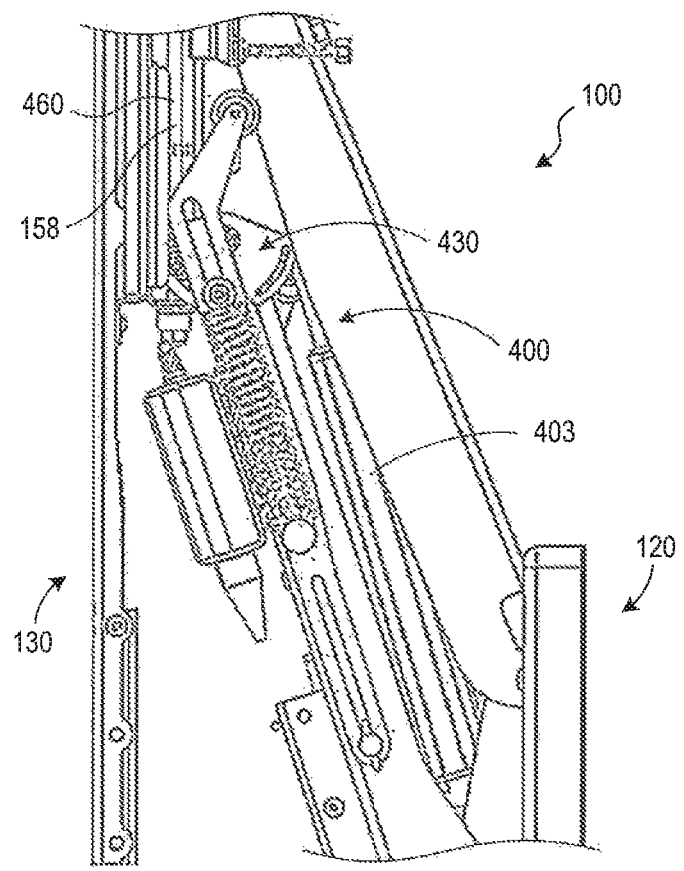
FIGS. 9A-9C are partial right-side views of a raised, partially lowered, and lowered wall mount assembly, respectively, with the right-side swivel mechanism assembly in the forward configuration, in accordance with at least some embodiments.
Figure 9B:
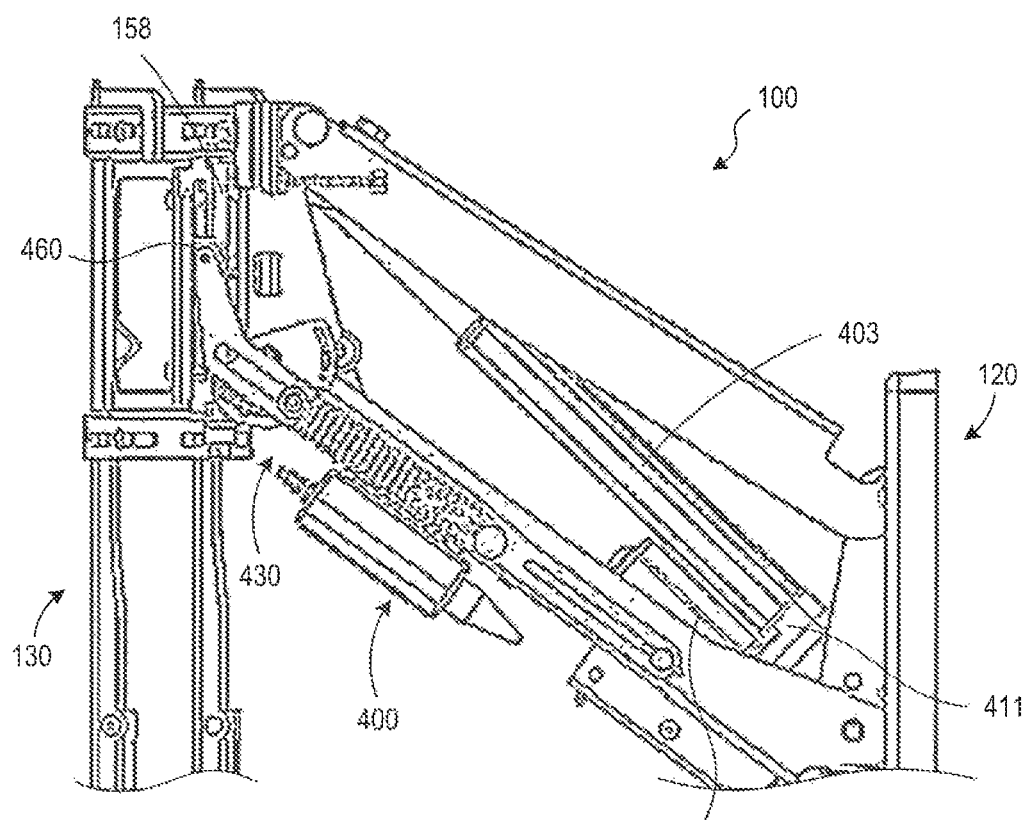
Figure 9C:
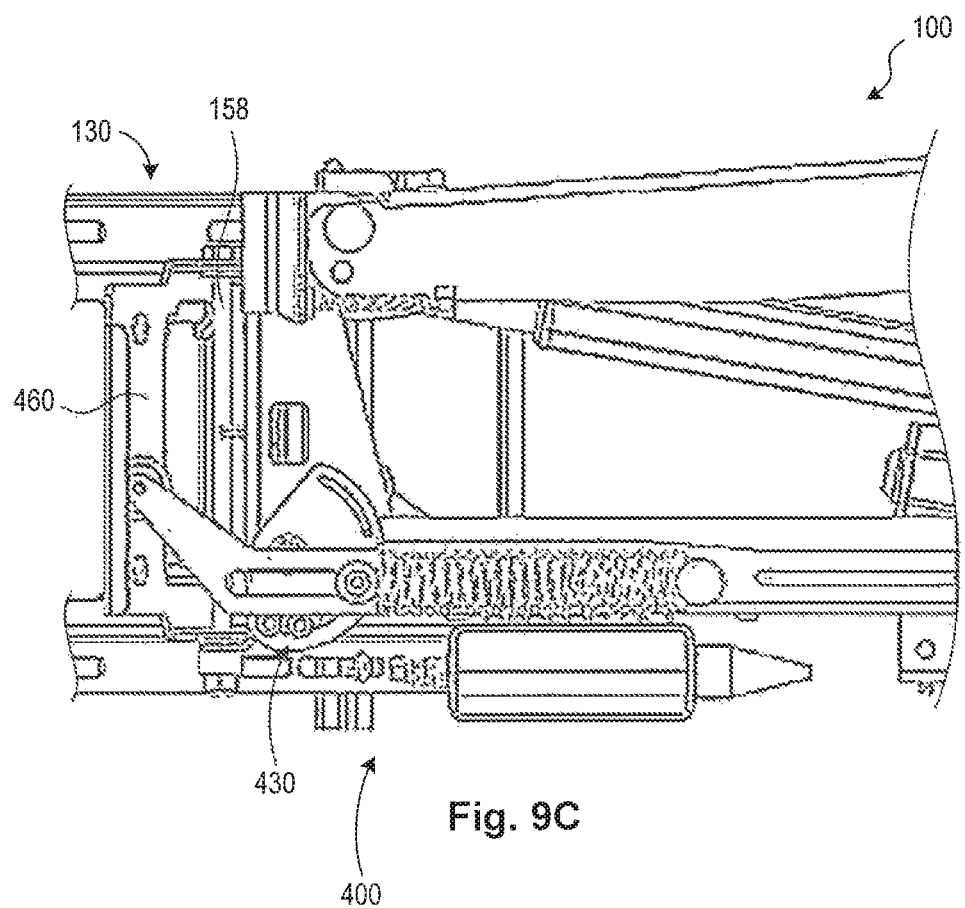

FIGS. 9A-9C illustrate the wall mount assembly 100 with the wall mount assembly 100 in the raised, the partially lowered, and the lowered positions, respectively, with the swivel mechanism assembly 400 in the forward configuration. Viewed in sequence, FIGS. 9A-9C illustrate operation of the swivel mechanism assembly 400 to swivel the display mounting portion 130 to the left when the wall mount assembly 100 moves from the raised position to the lowered position. As shown, the cam assembly 430 presses against the camming surface 460 to rotate the display mounting portion 130 about the rod 158.

The actuator 403 can include one or more linear actuators 409 (FIG. 9B), motors 407 (FIG. 9B), controllers 411 (FIG. 9B), processing units, combinations thereof, or the like. Referring to FIG. 9A, the actuator 403 can be a linear actuator rotatably coupled to the wall mounting portion 120 and the display mounting portion 130. The actuator 403 can include one or more drive motors, stepper motors, or the like that are mounted on the linear actuator 409 (FIG. 9B), wall mounting portion 120, or another suitable component. In some embodiments, the controller 411 includes one or more processing units and is carried by the motor 407. The actuator 403 can operate to automatically move the television to a desired viewing height while the television can be gradually swiveled (e.g., mechanically swivelled as discussed above) for optimal viewing. The configuration and components of the actuator 403 can be selected based on the desired functionality and modes of operation.

The wall mount assembly 100 of FIGS. 4-9C can include one or more actuators, motors, controllers, remotes, and other features disclosed in U.S. Patent Application No. 61/396,850; U.S. Pat. Nos. 8,724,037; 8,864,092; 8,724,037; 9,625,091; 10,859,201; 10,935,180; 9,876,984; 10,257,460; 10,277,860; 10,738,941; U.S. Patent Application No. 61/913,195; U.S. Pat. Nos. 9,625,091; 10,281,080; U.S. patent application Ser. No. 16/033,972; U.S. patent application Ser. No. 16/370,854; U.S. patent application Ser. No. 16/924,551; U.S. patent application Ser. No. 17/026,088; U.S. patent application Ser. No. 16/375,835; U.S. patent application Ser. No. 17/090,701; U.S. Patent Application No. 62/553,961; U.S. Pat. No. 10,738,941; U.S. patent application Ser. No. 16/918,718; International Application No. PCT/US21/17141; U.S. Patent Application No. 62/950,524; U.S. Patent Application No. 62/972,643; and U.S. Patent Application No. 62/971,974. For example, the actuator 403 can be operated using a wireless remote configured to program preset positions, voice-controlled, or otherwise controlled, as disclosed in U.S. Pat. Nos. 8,724,037; 10,738,941.

Figure 10:
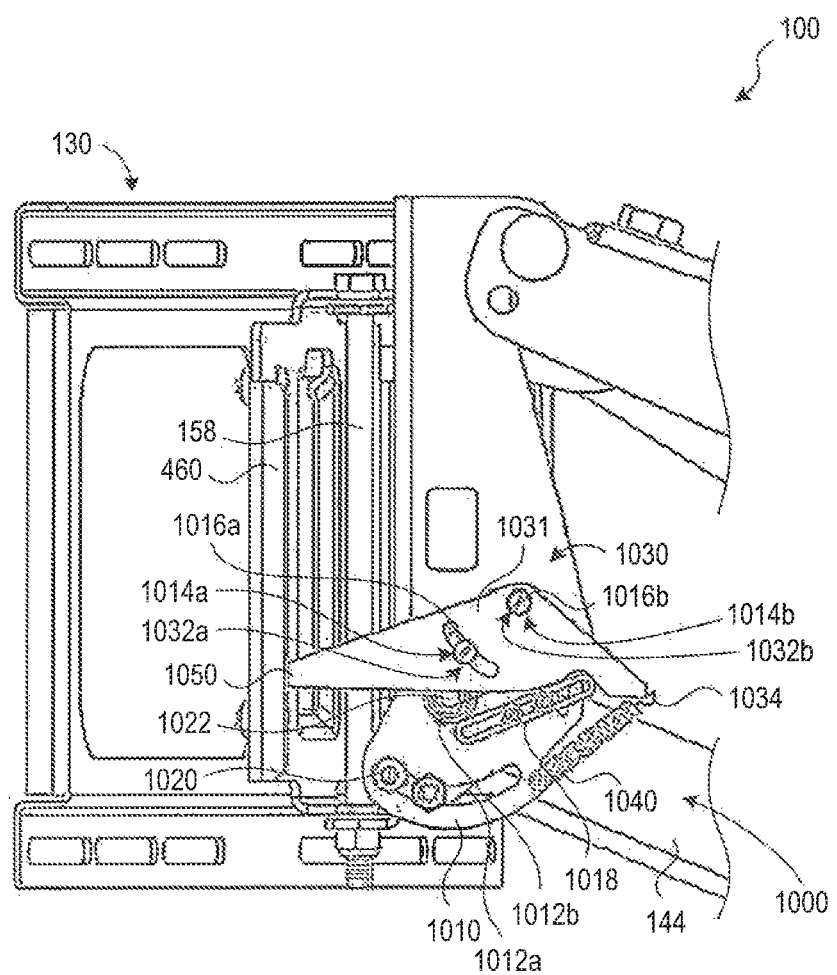
FIG. 10 is a partial right-side view of a partially lowered wall mount assembly with a right-side swivel mechanism assembly in accordance with at least some embodiments.

FIG. 10 is a right-side view of the partially lowered wall mount assembly 100 with a second embodiment of the swivel mechanism assembly attached to the right side of the wall mount assembly 100. Using the swivel mechanism assembly 1000, the display mounting portion 130 may be swiveled to a predetermined swivel position by a rotating cam assembly 1030, functionally similar to the cam assembly 430 (FIGS. 4-9C). The swivel mechanism assembly 1000 may further be similar to the first embodiment in its operation to swivel the display mounting portion 130 when the wall mount assembly 100 is lowered by pressing the cam assembly 1030 into the camming surface 460. The swivel mechanism assembly 1000 may be spring-biased to, for example, provide cushioning upon initial contact with the television mounting portion 130, hold the television mounting portion 130 against the set screw, or provide similar functions for smooth operation of the swivel mechanism assembly 1000. The user can manually rotated the right-side swivel mechanism assembly 1000 about a retention bolt 1022 anywhere between a counterclockwise configuration (corresponding with the swivel mechanism assembly 400 "forward configuration") and a clockwise configuration (corresponding with the swivel mechanism assembly 400 "rearward configuration") to increase or decrease, respectively, the swivel angle of the television mounting portion 130. As illustrated, the swivel mechanism assembly 1000 is in a counterclockwise or "forward" configuration.

The swivel mechanism assembly 1000 can include an adjustment plate 1010 and a cam assembly 1030. The adjustment plate 1010 can be a generally planar member with an adjustment rotation slot 1012a and an adjustment pivot hole 1012b, a first alignment post 1014a and a second alignment post 1014b (collectively, the "alignment posts 1014a— b"), a cam assembly stop 1018. The alignment posts 1014a—b may extend from the adjustment plate 1010 opposite the lower arm 144. The adjustment rotation slot 1012a can be an arced slot at a set radial distance away from the center of the adjustment pivot hole 1012b. The adjustment plate 1010 can be attached to the lower arm 144 by an adjustment knob assembly 1020 extending through the adjustment rotation slot 1012a and by a retention bolt or element 1022 extending through the adjustment pivot hole 1012b.

The adjustment knob assembly 1020 can include a threaded shaft and a knob or bolt, generally similar to the threaded shaft 421 and the knob 426 of the adjustment knob assembly 420. The threaded shaft can correspond with a threaded hole in the lower arm 144 for securing the adjustment plate 1010 to the lower arm 144. The retention element 1022 may also have a threaded shaft that correspond with a threaded hole in the lower arm 144 for securing the adjustment plate 1010 to the lower arm 144. The retention element 1022 may alternatively be welded, riveted, or otherwise fixedly coupled to the lower arm 144.

With the adjustment knob assembly 1020 extending through the adjustment rotation slot 1012a and the retention bolt or element 1022 extending through the adjustment pivot hole 1012b, the adjustment plate 1010 may pivot about the retention element 1022 limited by the interface between the adjustment knob assembly 1020 with the adjustment rotation slot 1012a and the retention element 1022 with the adjustment pivot hole 1012b. The adjustment plate 1010 may be rotated counterclockwise or "forward" until the adjustment knob assembly 1020 contacts a first end of the rotation slot 1012a or may be rotated clockwise or "rearward" until the adjustment knob assembly 1020 contacts a second end of the rotation slot 1012a, or may be rotated between the first end and second.

When the adjustment knob assembly 1020 is loose, the adjustment plate 1010 can rotate about the retention element 1022 threaded shaft. The adjustment plate 1010 may be prevented from rotating relative to the lower arm by, for example, tightening the adjustment knob assembly 1020 to press the adjustment plate 1010 against the lower arm 144. When the adjustment knob assembly 1020 is tightened, the knob can compress the adjustment plate 1010 against the lower arm 144.

The cam assembly stop 1018 may be a ridged member attached to or protrusion from the adjustment plate 1010 opposite the lower arm 144 between the adjustment rotation slot 1012a and the adjustment pivot hole 1012b and interfacing with the cam assembly 1030. The cam assembly stop 1018 may be configured to prevent clockwise rotation of the cam assembly 1030 past the clockwise configuration. As illustrated, the cam assembly stop 1018 includes an elongated ring coupled to the adjustment plate 1010 by two bolts. The cam assembly stop 1018 may slide along the two bolts. The cam assembly stop 1018 may also be secured in place, setting a stop-position for the cam assembly 1030, by the two bolts.

The cam assembly 1030 can be a generally triangular cam plate 1031 with a cam rotation slot 1032a and a cam pivot hole 1032b, a connector 1034, a biasing component 1040 having a first end and a second end, and a cam 1050. The cam rotation slot 1032a can be an arced slot at a set radial distance away from the center of the cam pivot hole 1032b. The cam assembly 1030 can be attached to the adjustment plate 1010 by the alignment posts 1014a—b extending through the cam rotation slot 1032a and the cam pivot hole 1032b, respectively, with a bolt 1016a fastened to the first alignment post 1014a and a bolt 1016b fastened to the second alignment post 1014b. The connector 1034 can be at a point of the cam assembly 1030 distanced from the display mounting portion 130 that connects the first end of the biasing component 1040 to the cam plate 1031. The second end of the biasing component 1040 is connected to the adjustment plate 1010. In this configuration, the cam plate 1031 may rotate about the cam pivot hole 1032b between the counterclockwise or "forward" configuration and the clockwise or "rearward" configuration, limited by the interface between the alignment post 1014a and the cam rotation slot 1032a and between the alignment post 1014b and the cam pivot hole 1032b.

As described, the biasing component 1040 can be connected to the connector 1034 and the adjustment plate 1010. When the cam plate 1031 is rotated counterclockwise, the biasing component 1040 exerts a biasing force against the connector 1034 and the adjustment plate 1010 to bias the cam plate 1031 to rotate clockwise. As illustrated, the biasing component 1040 is a coil spring. However, the biasing component 1040 may be any structure that, when extended, biases the cam plate 1031 in the clockwise direction.

The cam 1050 may be a portion of the cam plate 1031 opposite the connector 1034 and closest to the display mounting portion 130. The cam 1050 may be configured to interface with the camming surface 460 of the display mounting portion 130 when the wall mount assembly 100 is lowered to swivel the display mounting portion 130. The cam 1050 may instead be a wheel ratably coupled to the cam assembly 1030 or may be any structure that can repeatably rub against the camming surface 460 without sticking or experiencing excessive wear at high wall mount assembly 100 operating cycle counts.

The swivel mechanism assembly 1000 as illustrated on the right side of the wall mount assembly 100 may, instead or additionally, be transposed to the left side of the wall mount assembly 100. On the left side, the swivel mechanism assembly 1000 may function like the illustrated right-side swivel mechanism assembly 1000 to swivel the display mounting portion 130 to the right when the wall mount assembly 100 is lowered. The left-side swivel mechanism assembly 1000 may swivel the display mounting portion 130 to the furthest possible right swivel position or until the display mounting portion 130 contacts the set screw 462 on the right side of the wall mount assembly 100 (not illustrated in FIG. 10). When transposed to the left side of the wall mount assembly 100, the rotational orientation of the swivel mechanism assembly 1000 and its subcomponents may be opposite from the right-side swivel mechanism assembly 1000. For example, the left-side swivel mechanism assembly 1000 may (i) rotate to a clockwise configuration, functioning similarly to the forward configuration of the swivel mechanism assembly 400 and the counterclockwise configuration of the right-side swivel mechanism assembly 1000 and (ii) rotate to a counterclockwise configuration, functioning similar to the rearward configuration of the swivel mechanism assembly 400 and the clockwise configuration of the right-side swivel mechanism assembly 1000.

Figure 11:
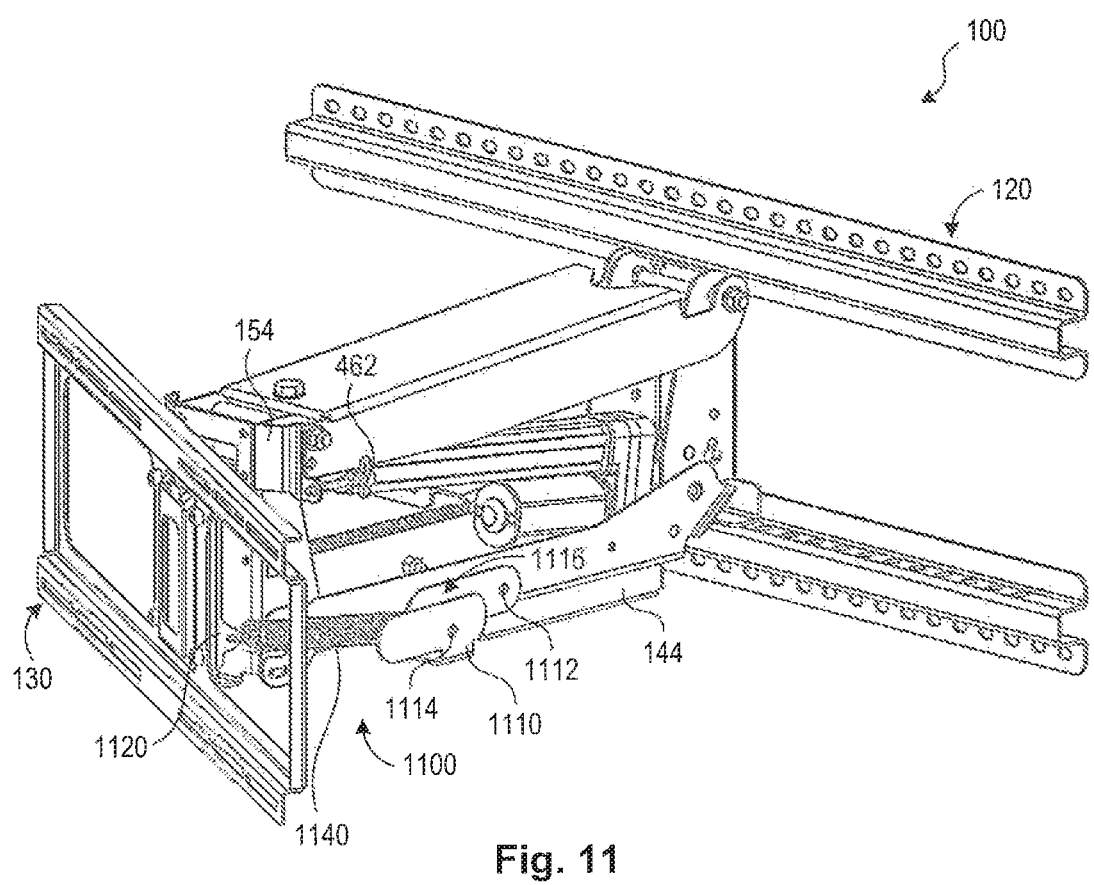
FIG. 11 is a front isometric view of a lowered wall mount assembly with a right-side swivel mechanism assembly in a forward position in accordance with at least some embodiments.

FIG. 11 is a front isometric view of the lowered wall mount assembly 100 with a third embodiment of the swivel mechanism assembly attached to the right side of the wall mount assembly 100. When the wall mount assembly 100 is moved toward the illustrated lowered position, a swivel mechanism assembly 1100 with a biasing component 1140 on the right or left side of the extending/contracting portion 140 may pull against the television mounting portion 130 to swivel the television mounting portion 130 relative to the extending/contracting portion 140. The user can select whether the television mounting portion 130 swivels to the right, left, or does not swivel, by rotating the right and left swivel mechanism assemblies 1100 each between a forward configuration and a rearward configuration. When the right-side swivel mechanism assemblies 1100 is in the rearward configuration (FIG. 12A), the biasing component 1140 is extended as the wall mount assembly 100 is lowered and the biasing component 1140 exerts a pulling force to swivel the television mounting portion 130 to the right. Conversely, when the left-side swivel mechanism assembly 1100 is in the rearward configuration (as configured in FIG. 11 but not visible), the biasing component 1140 is extended as the wall mount assembly 100 is in the lowered position and exerts a pulling force to swivel the television mounting portion 130 to the left. When both the right-side and left-side swivel mechanism assemblies 1100 are in the rearward or forward configuration, either or both swivel mechanism assemblies exert an equal or no pulling force, respectively, against the television mounting portion 130 when the wall mount assembly 100 lowered. In this configuration, the television mounting portion 130 remains in a neutral swivel position, neither swiveling to the right nor the left.

As previously discussed, the swivel mechanism assembly 1100 may be rotated between the forward configuration and the rearward configuration. Here, the right-side swivel mechanism assembly 1100 is in the forward configuration. The swivel mechanism assembly 1100 may include a handle 1110 pivotably coupled to the lower arm 144 at a handle hinge 1112 having a biasing component attachment point 1114, the biasing component 1140, and the television mounting portion 130 may have a connection point 1120. The connection point 1120 can include one or more couplers, linear springs, torsion springs, pushing rams, pulling hooks, cams, wheels, sensors (e.g., proximity sensors, contact sensors, force sensors, etc.), or the like. The features and configuration of the connection point 1120 can be selected based on the desired automated movement of the television. The biasing component 1140 can include one or more biasing components, linear spring, compression springs, pistons, etc. and may be coupled to the handle 1110 at the biasing component attachment point 1114 and coupled to the display mounting portion 130 at the connection point 1120 offset to the right from where the display mounting portion 130 is coupled to the extending/contracting portion 140. The handle 1110 may be an elongated member with a biasing component recess 1116. The handle 1110 may rotate between a forward position and a rearward position, corresponding with the forward and rearward configurations of the swivel mechanism assembly 1100. In the forward position, the handle 1110 is rotated toward the display mounting portion 130 and allows the biasing component 1140 to be in a slacked configuration. In the rearward position, the handle 1110 is rotated toward the wall mounting portion 120 and places the biasing component 1140 in an extended configuration. When the biasing component 1140 is in the slacked configuration, the biasing component 1140 exerts a minimal to null pulling force between the biasing component attachment point 1114 and connection point 1120. When the biasing component 1140 is in the extended configuration, the biasing component 1140 exerts a pulling force between the biasing component attachment point 1114 and the connection point 1120. This pulling force causes the display mounting portion 130 to swivel either to the right or left. The display mounting portion 130 swivels to the right when the extended state biasing component 1140 in on the right side of the wall mount assembly 100 and the display mounting portion 130 swivels to the left when the extended state biasing component 1140 is on the left. The display mounting portion 130 will continue to swivel in response to the pulling force until the display mounting portion 130 contacts the set screw 462 on the same side of the wall mount assembly as the extended state biasing component 1140.

As illustrated, the handle 1110 has a "U"-shaped cross section with the biasing component attachment point 1114 on the "U"-upright and away from the lower arm 144. The handle 1110 may alternatively have an "I"-shaped cross section or "L"-shaped cross section. The handle 1110 may further have another similar cross section providing a biasing component recess 1116 for the biasing component 1140, to be disposed within when the swivel mechanism assembly 1100 is in the forward or rearward configuration. Regardless of handle 1110 cross-section, the biasing component attachment point 1114 may alternatively be located proximate to the lower arm 144, for example, on the "U"-upright proximate the lower arm 144. The component attachment point 1114 may further be on the bottom of the "U"-shape or other lower portion of the handle 1110, or on a shaft or other attachment extending between the "U"-uprights. As illustrated, the biasing component 1140 is a coil spring. The biasing component 1140 may, however, be any structure that, when extended, exerts a pulling force on the display mounting portion 130 at the connection point 1120 to swivel the display mounting portion 130.

Figure 12A:
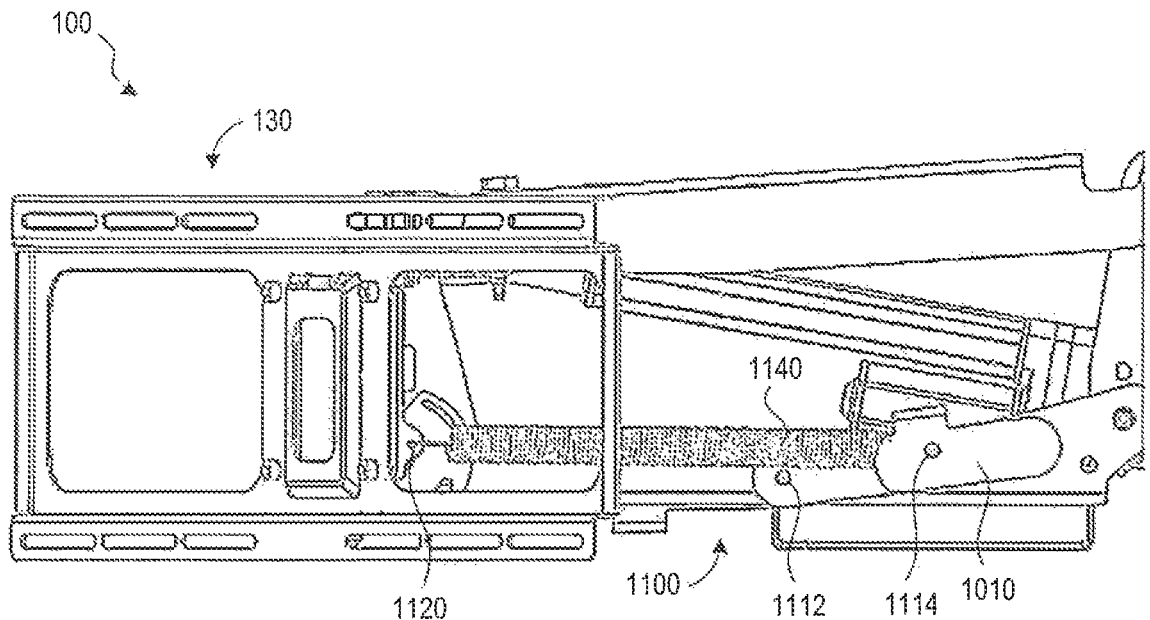
FIG. 12A is a right-side view of the lowered wall mount assembly of FIG. 11 with the right-side swivel mechanism assembly in a backward position.
Figure 12B:
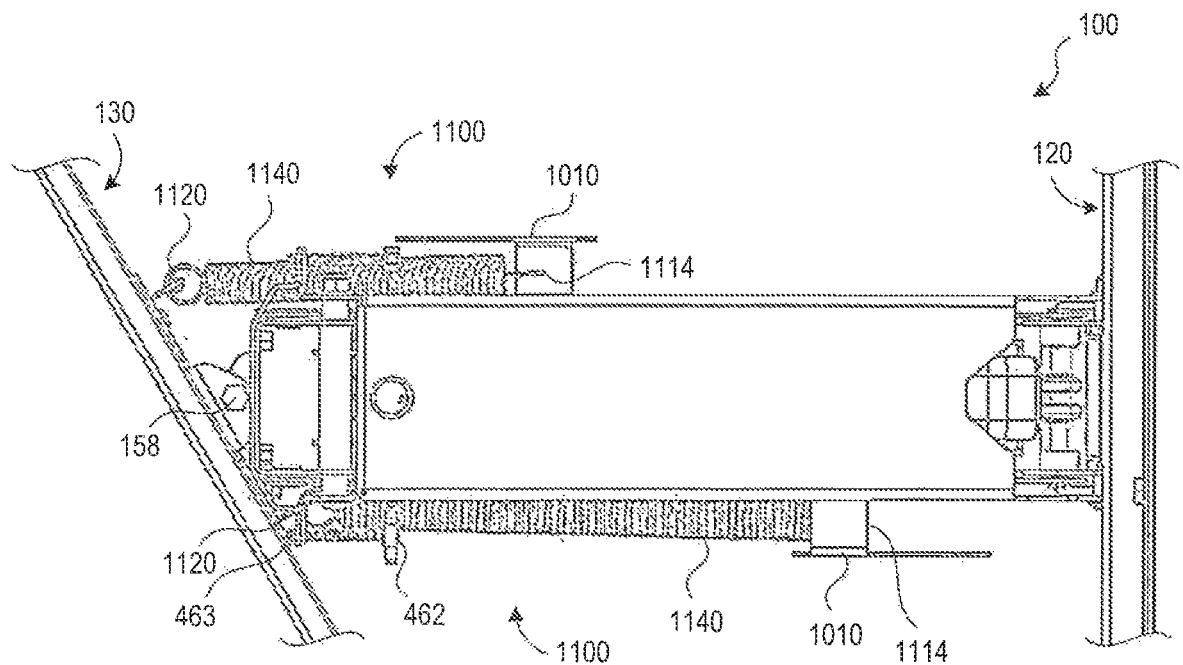
FIG. 12B is a partial top view of the lowered wall mount assembly of FIG. 11 with the right-side swivel mechanism assembly in the backward position and a left-side swivel mechanism assembly in the forward position.

FIGS. 12A and 12B show the lowered wall mount assembly 100 with the swivel mechanism assembly 1100 on the right and left side of the wall mount assembly 100 swiveling the display mounting portion 130 to the furthest right swivel position. Here, the right-side swivel mechanism assembly 1100 is rotated to the rearward configuration and the left-side swivel mechanism assembly 1100 is rotated to forward configuration (FIG. 12B). In this configuration, the left biasing component 1140 is slacked and exerting a minimal or null pulling force between the biasing component attachment point 1114 and connection point 1120 on the left side of the wall mount assembly 100. The right biasing component 1140 is extended and exerting a pulling force between the biasing component attachment point 1114 and connection point 1120 on the right side of the wall mount assembly 100, swiveling the display mounting portion 130 to a right swiveled position until the display mounting portion 130 contacts the end 463 (FIG. 12B) of the set screw 462 on the right side of the wall mount assembly 100.

Figure 13:
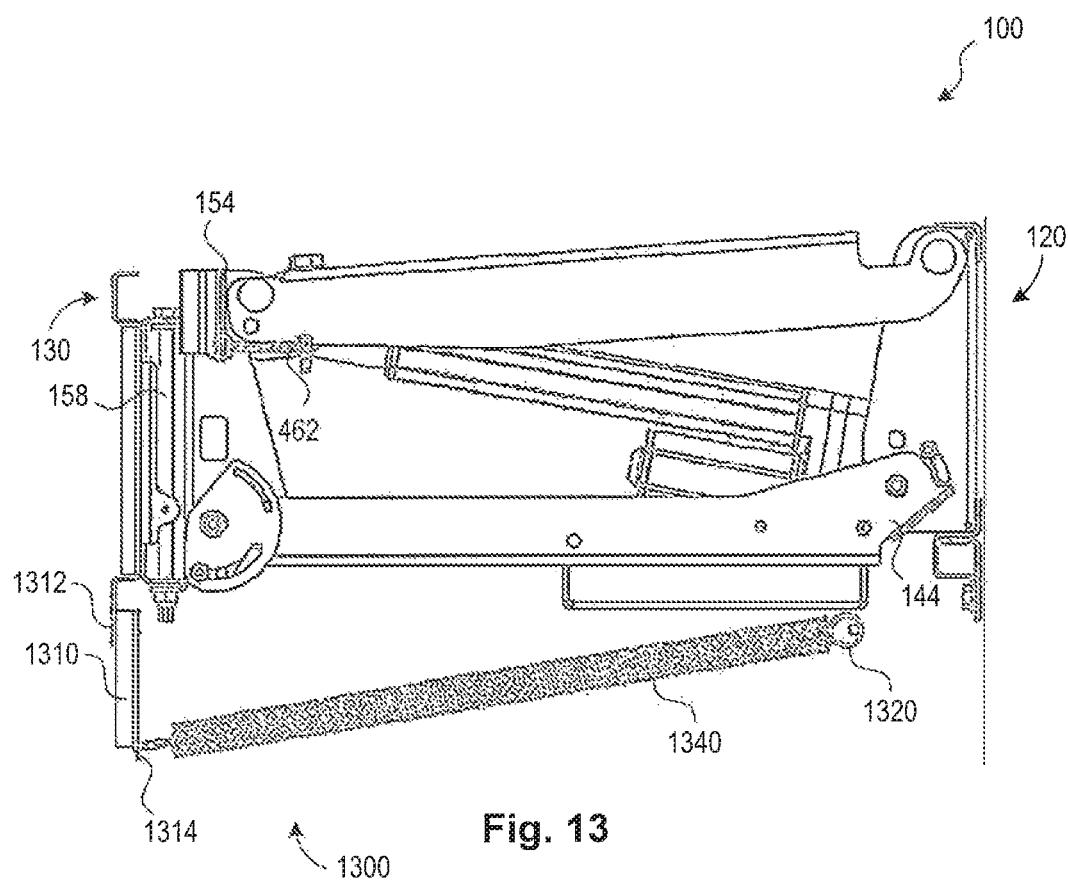
FIG. 13 is a right-side view of a lowered wall mount assembly with a swivel mechanism assembly in a neutral position in accordance with at least some embodiments.

FIG. 13 is a right-side view of the wall mount assembly 100 with a fourth embodiment of the swivel mechanism assembly attached to the bottom of the wall mount assembly 100. When the wall mount assembly 100 is moved toward the illustrated lowered position, a swivel mechanism assembly 1300 with a handle 1310 rotatably coupled to the television mounting portion 130 and a biasing component 1340 below the television mounting portion 130 and the extending/contracting portion 140 may pull against and swivel the television mounting portion 130 about the rod 158. The user can select whether the television mounting portion 130 swivels to the right, left, or remains in a neutral position by rotating the swivel mechanism assembly 1300 between a right-swivel configuration, a neutral swivel configuration, and a left-swivel configuration. In all configurations, the biasing component 1340 is extended when the wall mount assembly 100 is lowered and exerts a polling force between the handle 1310 and the extending/contracting portion 140. This pulling force is exerted against an end the handle 1310 opposite the television mounting portion 130 at a location either to the right, left, or aligned with the rod 158.

When the swivel mechanism assembly 1300 is in the right-swivel configuration, the handle 1310 is rotated counterclockwise to a position parallel with the bottom of the display mounting portion 130. In this configuration, the biasing component 1340 may exert a pulling force on handle 1310 to the right of the rod 158 and swivel the television mounting portion 130 to the right. Conversely, when the swivel mechanism assembly 1300 is in the left-swivel configuration (shown in FIG. 14), the handle 1310 is rotated clockwise to a position parallel with the bottom of the display mounting portion 130. In this configuration, the biasing component 1340 may exert a pulling force on the handle 1310 to the left of the rod 158 and swivel the television mounting portion 130 to the left. When the swivel mechanism assembly 1300 is in the neutral swivel configuration (shown in FIG. 13), the handle 1310 is rotated perpendicular to (i.e., extending down from) the bottom of the display mounting portion 130. In this configuration, the handle 1310 is vertically aligned with the rod 158 and the biasing component 1340 exerts a pulling force on the handle 1340 likewise aligned with the rod 158. Here, the display mounting portion 130 is held in a neutral swivel position roughly perpendicular to the extending/contracting portion 140.

The swivel mechanism assembly 1300 may include a handle 1310 and a biasing component 1340. The handle 1310 may be an elongated member with a handle hinge 1312 and a biasing component attachment point 1314 opposite the handle hinge. The handle 1310 may be pivotably coupled and extending from to the bottom of the display mounting portion 130 at the handle hinge 1312. As previously discussed, the handle 1310 may rotate counterclockwise to the right-swivel configuration, clockwise to the left-swivel configuration, or either counterclockwise or clockwise to the neutral swivel configuration. In the left- and right-swivel configurations, the biasing component attachment point 1314 may be located to the left or right of the rod 158, respectively. In the neutral swivel configuration, the biasing component attachment point 1314 may be aligned with the rod 158.

When the swivel mechanism assembly 1300 is included in the wall mount assembly 100, the lower arm 144 may further include a connection point 1320 on the bottom of the lower arm 144. The biasing component 1340 may have a first end and a second end opposite the first. The first end of the biasing component 1340 may be coupled to the handle 1310 at the biasing component attachment point 1314 and the second end coupled to the lower arm 144 at a connection point 1320. The biasing component 1340 may further have an extended configuration and a slacked configuration. When the wall mount assembly 100 is raised, the biasing component 1340 may be in the slacked configuration. In the slacked configuration, the biasing component 1340 may exert a minimal or null pulling force between the biasing component attachment point 1314 and the connection point 1320. When the wall mount assembly 100 is lowered, the biasing component 1340 may be placed in the extended state and exert a pulling force between the biasing component attachment point 1314 and the connection point 1320. Depending on the configuration of the handle 1310, the pulling force on the biasing component attachment point 1314 may exert a force on the display mounting portion 130 (via the handle 1310) to the left, right, or aligned with the rod 158. This force may generate a torque on the television mounting portion 130 about the rod 158 and swivel or maintain the neutral position of the display mounting portion 130.

Figure 14:
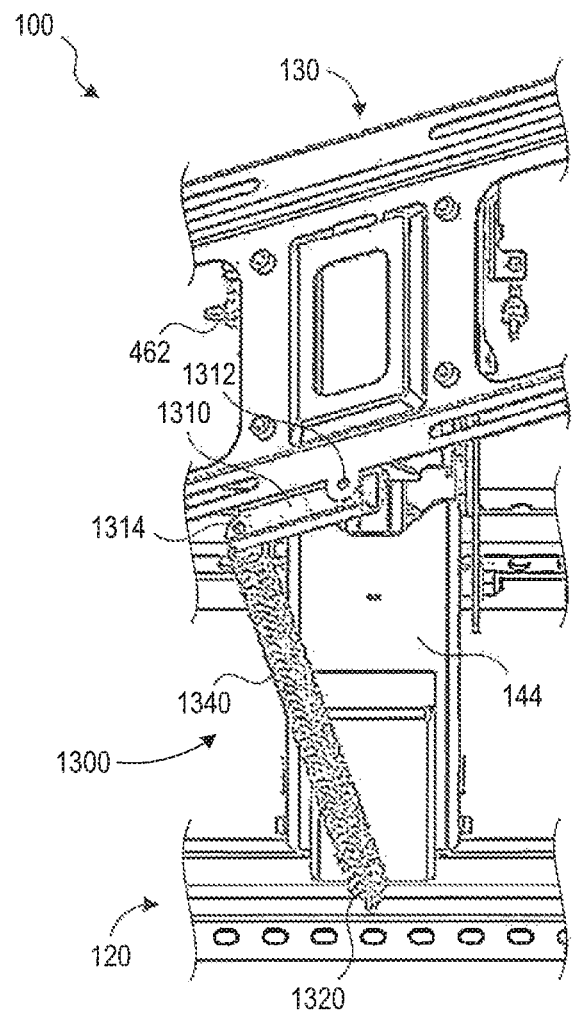
FIG. 14 is a front isometric view of the lowered wall mount assembly of FIG. 13 with the swivel mechanism assembly in a left position.

FIG. 14 is a front isometric view of the lowered wall mount assembly 100 with the swivel mechanism assembly 1300 in the left-swivel configuration. As shown in FIG. 14, the biasing component 1340 is extended and exerting a pulling force between the biasing component attachment point 1314 and the connection point 1320. This pulling force exerted on the biasing component attachment point 1314 acts on the display mounting portion 130 to the left of the rod 158, thereby rotating the display mounting portion 130 to the left until the display mounting portion 130 contacts the end of the set screw 462 on the left side of the wall mount assembly 100. When the swivel mechanism assembly 1300 is in the right-swivel configuration, the biasing component 1340 is extended and exerting a pulling force on the display mounting portion 130 to the right of the rod 158, thereby rotating the display mounting portion 130 to the right until the display mounting portion 130 contacts the end of the set screw 462 on the right side of the wall mount assembly 100. When the swivel mechanism assembly 1300 is in the neutral-swivel configuration, the biasing component 1340 is extended and exerting a pulling force on the display mounting portion 130 aligned with the rod 158. Because the pulling force is aligned with the rod 158, no torque is generated and the display mounting portion 130 is not swiveled.

Related Applications and Patents

Additional apparatuses, components, controllers, software, methods of operation, methods for manufacturing, and other features are disclosed in the following patents and applications: U.S. Patent Application No. 61/396,850; U.S. Pat. Nos. 8,724,037; 8,864,092; 8,724,037; 9,625,091; 9,876,984; 10,257,460; 10,277,860; U.S. Patent Application No. 61/913,195; U.S. Pat. Nos. 9,625,091; 10,281,080; U.S. patent application Ser. No. 16/033,972; U.S. patent application Ser. No. 16/370,854; U.S. patent application Ser. No. 16/924,551; U.S. patent application Ser. No. 17/026,088; U.S. patent application Ser. No. 16/375,835; U.S. patent application Ser. No. 17/090,701; U.S. Patent Application No. 62/553,961; U.S. Pat. No. 10,738,941; U.S. patent application Ser. No. 16/918,718; International Application No. PCT/US21/17141; International Application No. PCT/US20/66196; U.S. patent application Ser. No. 17/173,116; U.S. Patent Application No. 62/950,524; U.S. Patent Application No. 62/972,643; and U.S. Patent Application No. 62/971,974. For example, controllers, actuators, motors, cam mechanisms, tilting features, pivot features, arms, gas springs, spring blocks, calibration screws, adjustment screws, adjustment collars, panning features, counterbalancing features, controllers, motors, etc., can be incorporated into mounts, arms, support brackets, display brackets, or other components disclosed herein. Additionally, the components and features disclosed herein can be incorporated into four-bar linkages, five-bar linkages, and other mounts or systems disclosed in applications or patents incorporated by reference. The systems and devices can be installed at different positions and orientations to move displays (e.g., monitors, televisions, etc.) to desired positions. All patents, applications, and other references cited herein are hereby incorporated by reference in their entirety. Any and all priority claims identified in the Application Data Sheet, or any correction thereto, are also hereby incorporated by reference in their entirety.

The embodiments shown in the Figures and described in connection with the Figures can include one or more linear actuators. Mounting devices disclosed herein can include a controller that communicates with a control device. The control device can include a receiver that is communicatively coupled (e.g., wirelessly coupled, capacitively coupled, inductively coupled, or the like) to a transmitter of the controller. The control device can store information in memory and can include one or more computing devices or processors. Memory can include, without limitation, volatile memory, non-volatile memory, read-only memory (ROM), random access memory (RAM), and the like. Stored information can include, but is not limited to, settings, weight of mounted object, or the like. Settings can include, but are not limited to, position settings (e.g., stowed positions, lowered positions, intermediate positions, or the like), times (e.g., times to automatically move the object), or the like. The controllers can be integrated or in communication with the actuators disclosed herein. The actuators or other features of mounts can include one or more microphones configured to receive audible information. The controllers can be programmed to operate in response to the audible input (e.g., voice commands), determine the location of obstacles, and/or avoid striking obstacles (e.g., shelves, pianos, furniture, or other obstacles). Additionally or alternatively, one or more safety sensors can be utilized and can be incorporated into components of the wall mount system. Additionally or alternatively, the control device can be programmed to move the display to various locations based upon, for example, the location of viewers, time settings, schedules, or voice commands. A timer can be used to determine when to automatically raise or lower the display. In some embodiments, authentication can be required to move the display. For example, the mounting systems and devices can be actuated only when an authorization password or other identifier is provided. This way children or other individuals cannot move the display.

The controller (e.g., controller 411 of FIG. 9B) can be a wireless controller with artificial intelligence functionality or other suitable functionality. For example, the controller can include or be compatible with hubs or automation devices (e.g., Google Home, Amazon's Alexa, etc.), or suitable device for receiving input from users. Voice commands can be used to raise and lower the mounting system, set mounting system positions, program mounting systems, or the like. In some embodiments, the controller can communicate wirelessly or via a wired connection with another device, such as an IoT hub or digital assistant (e.g., Google Home, Microsoft Cortana, Amazon Alexa, etc.). Wireless communication can be via a local network (e.g., WiFi network) or other suitable network. Additionally or alternatively, the control device can communicate with a hub, router, or electronic controller, such as Google Home, Amazon Echo, or the like. In some embodiments, the mounting system can be controlled with one or more voice commands, such as "Siri" (Apple), "Alexa" (Amazon), "Cortana" (Microsoft), Xbox, "OK Google" Google, and so forth. A button on the controller can be used to input voice commands. The controller can include one or more voice detectors (e.g., microphones) that operates to receive voice commands.

As a person skilled in the art would understand after careful perusal of this present disclosure and the Figures, the mechanism for automatically adjusting azimuth may be used in embodiments without linear actuators (i.e., manually operated wall mount assemblies). As a person skilled in the art would also understand after careful perusal of this present disclosure and the Figures, the mechanism for automatically adjusting azimuth may be used in embodiments that do not include manual springs for extending/contracting the displays (i.e., embodiments where an actuator is used without gas springs). These embodiments may need to include a second linear actuator or a larger single actuator to provide sufficient force for lifting the display. The inventor also contemplates embodiments with a single gas spring, with or without a linear actuator. More generally, the features described throughout this present disclosure may be present individually or in any combination or permutation, except where the presence or absence of specific elements/limitations is inherently required, explicitly indicated, or otherwise made clear from the context. Not every illustrated element is necessarily required in every embodiment in accordance with the concepts described in this present disclosure, while some elements that have not been specifically illustrated may be desirable in some embodiments in accordance with the concepts.

This present disclosure describes in detail the inventive wall mount assemblies. This was done for illustration purposes and, therefore, the foregoing description and the Figures are not necessarily intended to limit the spirit and scope of the invention(s) described. Neither the specific embodiments of the invention(s) as a whole, nor those of its (or their, as the case may be) features, necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances, some features will be employed in the absence of a corresponding use of other features. The embodiments described above are illustrative and not necessarily limiting, although they or their selected features may be limiting for some claims. The illustrative examples, therefore, do not necessarily define the metes and bounds of the invention(s) and the legal protection afforded the invention(s).

What is claimed is:

1. A television mount, comprising:
   a mount assembly configured to be coupled to a wall, the mount assembly including:
   a television mounting portion configured to carry a television, and
   an extending/contracting portion configured to allow movement of the television mounting portion between a raised position and a lowered position; and
   a swivel mechanism assembly coupled to the mount assembly and configured to set a preset swiveled position of the television mounting portion, wherein the swivel mechanism assembly includes
   a biasing component coupled to the mount assembly and configured to bias the television mounting portion toward the preset swiveled position when the extending/contracting portion is moved toward or in the lowered position.

2. The television mount of claim 1, wherein the swivel mechanism is reconfigurable to set the preset swiveled position as a right-swivelled configuration or a left-swiveled configuration.

3. The television mount of claim 1, wherein the biasing component has a tensioned configuration when the television mounting portion is in the lowered position and a slacked configuration when the television mounting portion is in the raised position.

4. The television mount of claim 1, wherein the biasing component is gradually tensioned when the television mounting portion moves from the raised position toward the lowered position.

5. The television mount of claim 1, further including a set screw that contacts the television mounting portion to limit swiveling of the television mounting portion caused by the biasing component.

6. The television mount of claim 1, wherein the biasing component is positionable on a left side of the mount assembly and positionable on a right side of the mount assembly to set a direction of swivel.

7. The television mount of claim 6, further comprising a handle movable relative to the television mounting portion to position an end of the biasing component on a left side of the mount assembly and positionable on a right side of the mount assembly.

8. The television mount of claim 7, further comprising a handle hinge that rotatably couples the handle to the television mounting portion.

9. The television mount of claim 1, further comprising a cam assembly including one or more cam slots that allow one or more respective members to slide to adjust an angular position of the television mounting portion.

10. A television mount, comprising:
    a mount assembly configured to be coupled to a wall, the mount assembly including:
    a television mounting portion configured to carry a television, and
    an extending/contracting portion coupled to the television mounting portion and configured to move the television mounting portion up and toward the wall and to move the television mounting portion down and away from the wall; and
    a swivel mechanism assembly coupled to the television mounting portion and the extending/contracting portion, wherein the swivel mechanism assembly has a first configuration, a second configuration different from the first configuration, and a biasing component configured to bias the television mounting portion to swivel in a first swivel direction when the television mounting portion is moved down and away from the wall and the swivel mechanism assembly is in the first configuration, and a second swivel direction when the television mounting portion is moved down and away from the wall and the swivel mechanism assembly is in the second configuration.

11. The television mount of claim 10, wherein the biasing component is further configured to exert a pulling force on the television mounting portion to swivel the television mounting portion in the first swivel direction when the extending/contracting portion is moved down and away from the wall.

12. The television mount of claim 10, wherein the swivel mechanism assembly includes a handle coupled to the mount assembly and rotatable between a first position and a second position corresponding with the first configuration and the second configuration, respectively, and wherein the biasing component is coupled to the mount assembly and the handle.

13. The television mount of claim 10, further comprising a handle having a handle connection point, wherein the extending/contracting portion includes a lower arm, wherein the television mounting portion includes a mounting portion connection point, and wherein the handle is rotatably coupled to the lower arm opposite the handle connection point and the biasing component is coupled to the mounting portion connection point and the handle connection point.

14. The television mount of claim 13, wherein the biasing component has an extended state and a relaxed state, and wherein when the handle is in a first position, the biasing component is in the extended state and exerting a first pulling force on the mounting portion connection point and the handle connection point, and when the handle is in a second position, the biasing component is in the relaxed state and exerting a second pulling force on the mounting portion connection point and the handle connection point, wherein the second pulling force is less than the first pulling force.

\* \* \* \* \*